(12) United States Patent
Kim et al.

(10) Patent No.: US 9,918,249 B2
(45) Date of Patent: Mar. 13, 2018

(54) METHOD AND APPARATUS FOR REMOVING INTERFERENCE AND RECEIVING SIGNAL IN WIRELESS COMMUNICATION SYSTEM

(71) Applicant: LG ELECTRONICS INC., Seoul (KR)

(72) Inventors: Hyungtae Kim, Seoul (KR); Kijun Kim, Seoul (KR); Inkwon Seo, Seoul (KR); Jonghyun Park, Seoul (KR); Yunjung Yi, Seoul (KR); Youngtae Kim, Seoul (KR); Kunil Yum, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 15/101,381

(22) PCT Filed: Dec. 24, 2014

(86) PCT No.: PCT/KR2014/012807
§ 371 (c)(1),
(2) Date: Jun. 2, 2016

(87) PCT Pub. No.: WO2015/099447
PCT Pub. Date: Jul. 2, 2015

(65) Prior Publication Data
US 2016/0316389 A1 Oct. 27, 2016

Related U.S. Application Data

(60) Provisional application No. 61/920,484, filed on Dec. 24, 2013, provisional application No. 61/929,477, (Continued)

(51) Int. Cl.
*H04W 4/00* (2009.01)
*H04W 28/04* (2009.01)
(Continued)

(52) U.S. Cl.
CPC ........ *H04W 28/048* (2013.01); *H04B 17/345* (2015.01); *H04L 5/0032* (2013.01); *H04W 24/08* (2013.01); *H04W 72/085* (2013.01)

(58) Field of Classification Search
CPC ... H04B 17/345; H04B 17/003; H04L 5/0032; H04L 43/50; H04L 43/0852; H04L 43/08;
(Continued)

(56) References Cited

U.S. PATENT DOCUMENTS 8,798,550 B2 * 8/2014 Hammarwall ....... H04B 7/0456
370/252
9,774,426 B2 * 9/2017 Seo ...................... H04L 5/0032
2013/0208604 A1 8/2013 Lee et al.

FOREIGN PATENT DOCUMENTS

KR 1020120094379 8/2012
KR 1020130006818 1/2013
WO 2013172760 11/2013

OTHER PUBLICATIONS

PCT International Application No. PCT/KR2014/012807, Written Opinion of the International Searching Authority dated Mar. 27, 2015, 16 pages.
(Continued)

*Primary Examiner* — Brenda H Pham
(74) *Attorney, Agent, or Firm* — Lee, Hong, Degerman, Kang & Waimey

(57) ABSTRACT

The present invention relates to a wireless communication system. A method for a terminal for removing interference and receiving a signal in a wireless communication system according to one embodiment of the present invention comprises the steps of: receiving configuration information for channel status information which has utilized interference measurements; and on the basis of the configuration information, measuring the interference from an interfering cell, and on the basis of the measured interference, measur- (Continued)

ing the channel status information from an interference measurement resource (IMR), wherein interference can be measured, in a resource block in which an IMR exists, on the basis of whether the interfering cell is transmitting data and the type of the signal transmitted from the IMR.

14 Claims, 14 Drawing Sheets

Related U.S. Application Data filed on Jan. 20, 2014, provisional application No. 61/932,759, filed on Jan. 28, 2014, provisional application No. 61/990,712, filed on May 9, 2014.

(51) Int. Cl.
*H04B 17/345* (2015.01)
*H04L 5/00* (2006.01)
*H04W 24/08* (2009.01)
*H04W 72/08* (2009.01)

(58) Field of Classification Search
CPC ... H04W 24/08; H04W 72/085; H04W 36/30; H04W 36/24; H04W 24/00; H04W 80/04
USPC ............................... 370/332, 252, 333, 349
See application file for complete search history.

(56) References Cited

OTHER PUBLICATIONS

Satoshi Nagata, et al., "Interference Measurement Scheme for CoMP in LTE-Advanced Downlink", IEEE 77th Vehicular Technology Conference (VTC Spring), Jun. 2013, 6 pages.

\* cited by examiner

FIG. 5
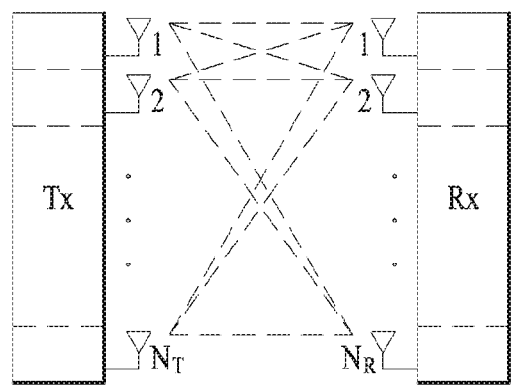
(a)
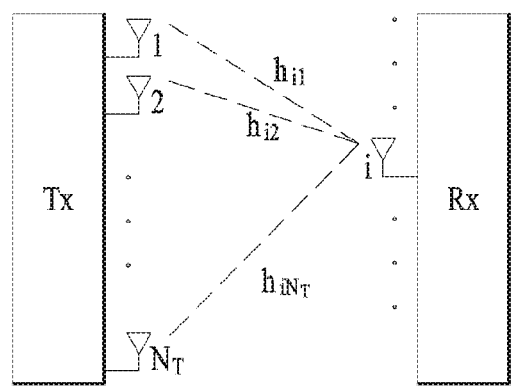
(b)

METHOD AND APPARATUS FOR REMOVING INTERFERENCE AND RECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2014/012807, filed on Dec. 24, 2014, which claims the benefit of U.S. Provisional Application Nos. 61/920,484, filed on Dec. 24, 2013, 61/929,477, filed on Jan. 20, 2014, 61/932,759, filed on Jan. 28, 2014 and 61/990,712, filed on May 9, 2014, the contents of which are all hereby incorporated by reference herein in their entirety.

TECHNICAL FIELD

The present invention relates to a wireless communication system, and more particularly, to a method of removing interference and receiving a signal in a wireless communication system and an apparatus therefor.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DISCLOSURE OF THE INVENTION

Technical Tasks

The present invention intends to propose a method of removing interference and receiving a signal in a wireless communication system and an apparatus therefor in the following based on the aforementioned discussion.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a signal, which is received by a user equipment by cancelling interference from the signal in a wireless communication system, includes the steps of receiving configuration information on channel state information using interference measurement and performing the interference measurement from an interfering cell based on the configuration information and measuring the channel state information at an IMR (Interference Measurement Resource) based on measured interference. In this case, the interference measurement can be performed based on whether or not data is transmitted from the interfering cell in a resource block at which the IMR exists and a type of a signal transmitted at the IMR.

If data is transmitted from the interfering cell in the resource block at which the IMR exists and a type of a signal transmitted at the IMR corresponds to the data, the channel state information measuring step can include the steps of detecting and regenerating an interference signal of the interfering cell at the IMR and measuring the channel state information based on interference power which is measured after the interference signal regenerated at the IMR is removed.

If data is not transmitted from the interfering cell in the resource block at which the IMR exists and no signal is transmitted at the IMR, the channel state information measuring step can include the step of measuring the channel state information based on interference power which is measured after a random interference signal is added to a signal received at the IMR.

If data is transmitted from the interfering cell in the resource block at which the IMR exists and a signal transmitted at the IMR corresponds to a CSI-RS (Channel-State Information-Reference Signal), the channel state information measuring step can include the steps of detecting and regenerating the CSI-RS of the interfering cell at the IMR and measuring the channel state information based on interference power which is measured after the CSI-RS regenerated at the IMR is removed.

If data is transmitted from the interfering cell in the resource block at which the IMR exists and a signal transmitted at the IMR corresponds to a CSI-RS (Channel-State Information-Reference Signal), interference power measurement may not be performed at the IMR.

If data is not transmitted from the interfering cell in the resource block at which the IMR exists and no signal is transmitted at the IMR, the channel state information measuring step can include the step of performing interference power measurement at the IMR and measuring the channel state information.

If data is not transmitted from the interfering cell in the resource block at which the IMR exists and a signal transmitted at the IMR corresponds to a CSI-RS (Channel-State Information-Reference Signal), the channel state information measuring step can include the steps of detecting and regenerating the CSI-RS of the interfering cell at the IMR and measuring the channel state information based on interference power which is measured after the CSI-RS regenerated at the IMR is removed.

To further achieve these and other advantages and in accordance with the purpose of the present invention, according to a different embodiment, a user equipment receiving a signal by cancelling interference from the signal in a wireless communication system includes an RF (Radio Frequency) unit and a processor configured to receive configuration information on channel state information using interference measurement, the processor configured to perform the interference measurement from an interfering cell based on the configuration information and measure the channel state information at an IMR (Interference Measurement Resource) based on measured interference. In this case, the interference measurement can be performed based on whether or not data is transmitted from the interfering cell in a resource block at which the IMR exists and a type of a signal transmitted at the IMR.

If data is transmitted from the interfering cell in the resource block at which the IMR exists and a type of a signal transmitted at the IMR corresponds to the data, the processor can be configured to detect and regenerate an interference signal of the interfering cell at the IMR and measure the channel state information based on interference power which is measured after the interference signal regenerated at the IMR is removed.

If data is not transmitted from the interfering cell in the resource block at which the IMR exists and no signal is transmitted at the IMR, the processor can be configured to measure the channel state information based on interference power which is measured after a random interference signal is added to a signal received at the IMR.

If data is transmitted from the interfering cell in the resource block at which the IMR exists and a signal transmitted at the IMR corresponds to a CSI-RS (Channel-State Information-Reference Signal), the processor can be configured to detect and regenerate the CSI-RS of the interfering cell at the IMR and measure the channel state information based on interference power which is measured after the CSI-RS regenerated at the IMR is removed.

If data is transmitted from the interfering cell in the resource block at which the IMR exists and a signal transmitted at the IMR corresponds to a CSI-RS (Channel-State Information-Reference Signal), the processor can be configured not to perform interference power measurement at the IMR.

If data is not transmitted from the interfering cell in the resource block at which the IMR exists and no signal is transmitted at the IMR, the processor can be configured to perform interference power measurement at the IMR and measure the channel state information.

If data is not transmitted from the interfering cell in the resource block at which the IMR exists and a signal transmitted at the IMR corresponds to a CSI-RS (Channel-State Information-Reference Signal), the processor can be configured to detect and regenerate the CSI-RS of the interfering cell at the IMR and measure the channel state information based on interference power which is measured after the CSI-RS regenerated at the IMR is removed.

Advantageous Effects

According to embodiments of the present invention, it is able to provide a method for a terminal to remove interference and receive a signal in a wireless communication system and an apparatus therefor.

Effects obtainable from the present invention may be non-limited by the above mentioned effect. And, other unmentioned effects can be clearly understood from the following description by those having ordinary skill in the technical field to which the present invention pertains.

It is able to use an information-reference signal.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a schematic diagram illustrating a wireless communication system having multiple antennas;

BEST MODE

Mode for Invention

Figure 1:
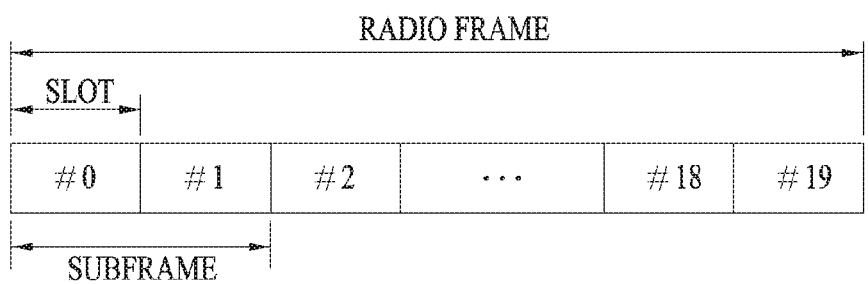
FIG. 1 is a diagram illustrating an example of a structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
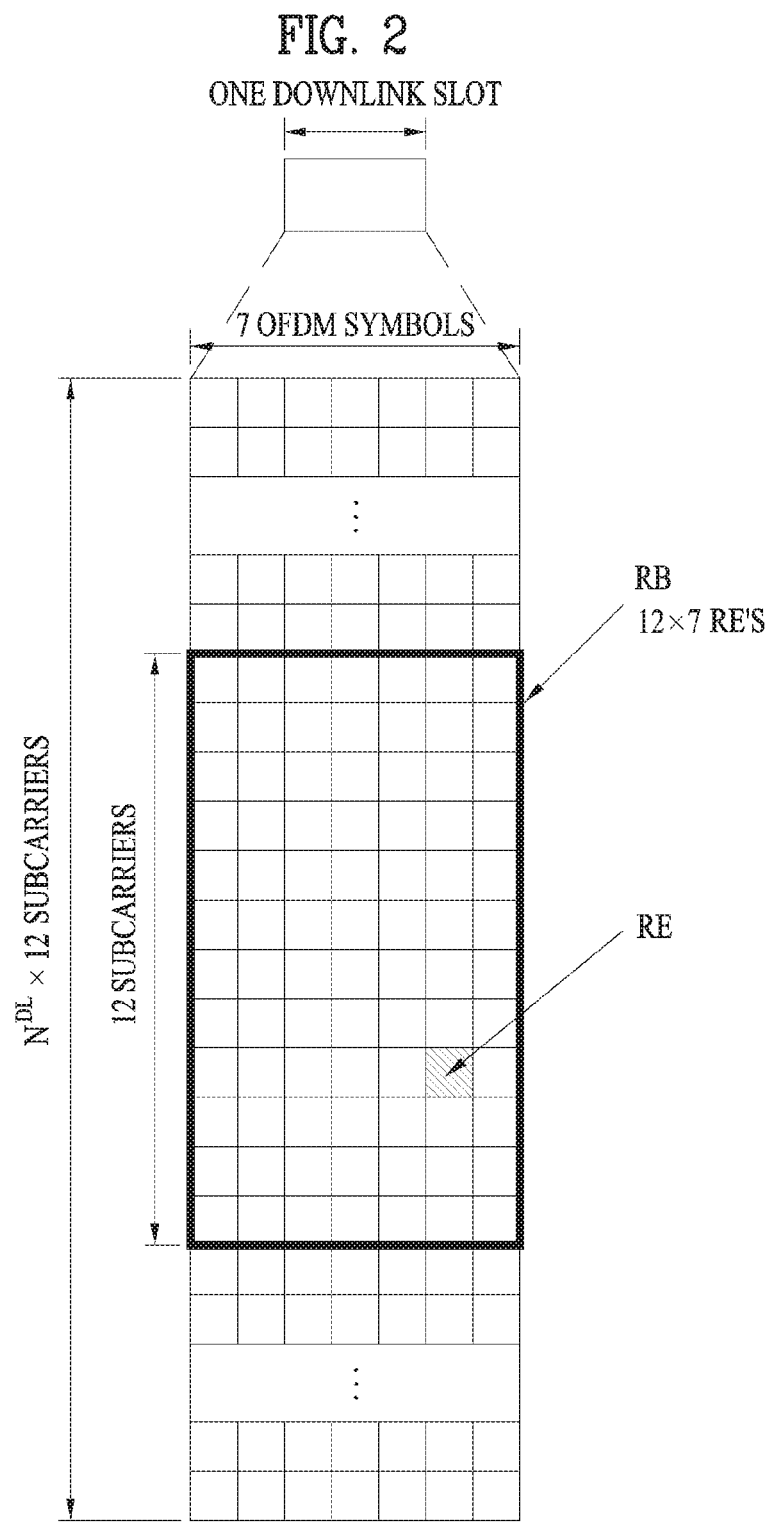
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

Figure 3:
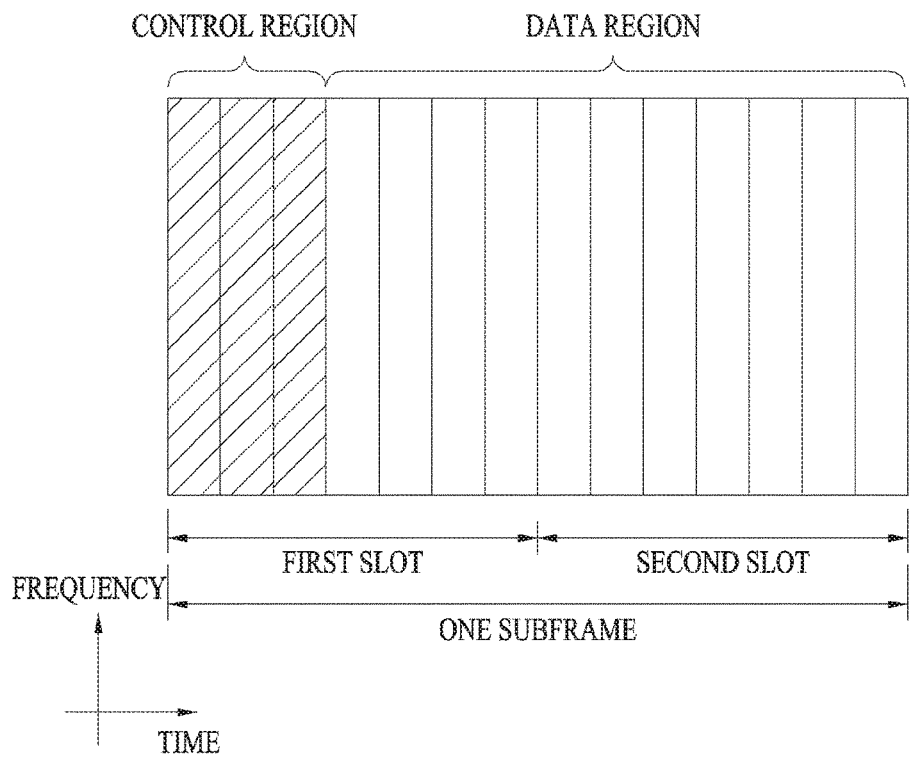
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
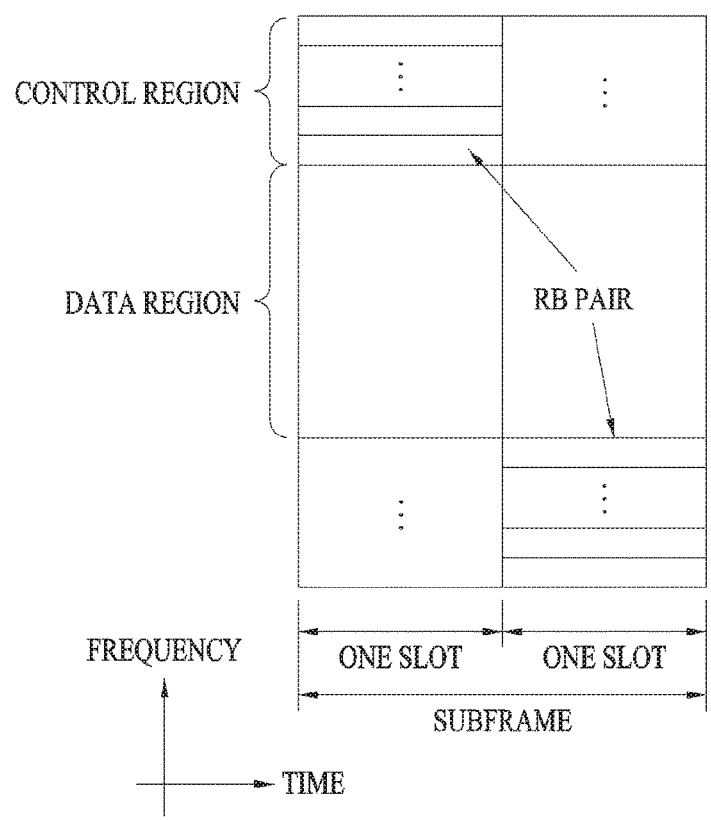
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate Ro that may be achieved with a single antenna and a transmission rate increase Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted through the NT Tx antennas, as expressed in Equation 2 below.

$$s=[s_1,s_2,\ldots,s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s}=[\hat{s}_1,\hat{s}_2,\ldots,\hat{s}_{N_T}]^T=[P_1s_1,P_2s_2,\ldots,P_{N_T}s_{N_T}]^T \qquad \text{[Equation 3]}$$

The transmission power-controlled transmission information vector ŝ may be expressed as follows, using a diagonal matrix P of transmission power.

$$\hat{s} = \begin{bmatrix} P_1 & & 0 \\ & P_2 & \\ & & \ddots \\ 0 & & & P_{NT} \end{bmatrix} \begin{bmatrix} s_1 \\ s_2 \\ \vdots \\ s_{N_T} \end{bmatrix} = Ps \qquad \text{[Equation 4]}$$

NT transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

Here, $W_{ij}$ refers to a weight between an ith Tx antenna and jth information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of NR Rx antennas, a reception signal of each antenna may be expressed as the vector shown in Equation 6 below.

$$y=[y_1,y_2,\ldots,y_{N_R}]^T \qquad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by hij. It should be noted that the index order of the channel hij is located before a reception (Rx) antenna index and is located after a transmission (Tx) antenna index.

FIG. 5(b) illustrates channels from NT Tx antennas to an Rx antenna i. The channels may be collectively represented in the form of vector and matrix. Referring to FIG. 5(b), the channels passing the range from the NT Tx antennas to the Rx antenna i can be represented by the Equation 7 below.

$$h_i^T=[h_{i1},h_{i2},\ldots,h_{iN_T}] \qquad \text{[Equation 7]}$$

All channels passing the range from the NT Tx antennas to NR Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \qquad \text{[Equation 8]}$$

Additive white Gaussian noise (AWGN) is added to an actual channel which has passed the channel matrix. The AWGN (n1, n2, . . . , nNR) added to each of NR reception (Rx) antennas can be represented by Equation 9 below.

$$n=[n_1,n_2,\ldots,n_{N_R}]^T \qquad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx+n$$

The number of rows and the number of columns of a channel matrix H indicating a channel condition are determined by the number of Tx/Rx antennas. In the channel matrix H, the number of rows is equal to the number (NR)

of Rx antennas, and the number of columns is equal to the number (NT) of Tx antennas. Namely, the channel matrix H is denoted by an NR×NT matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
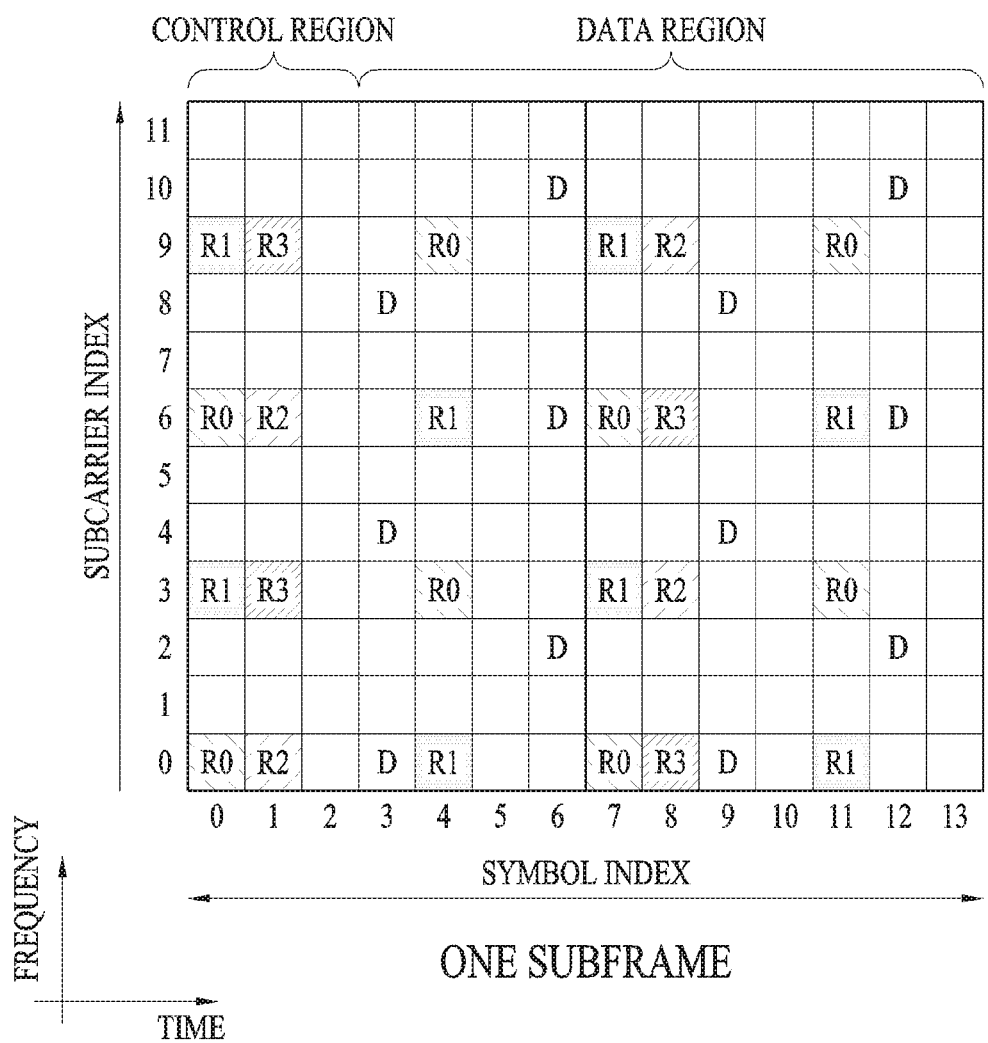
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
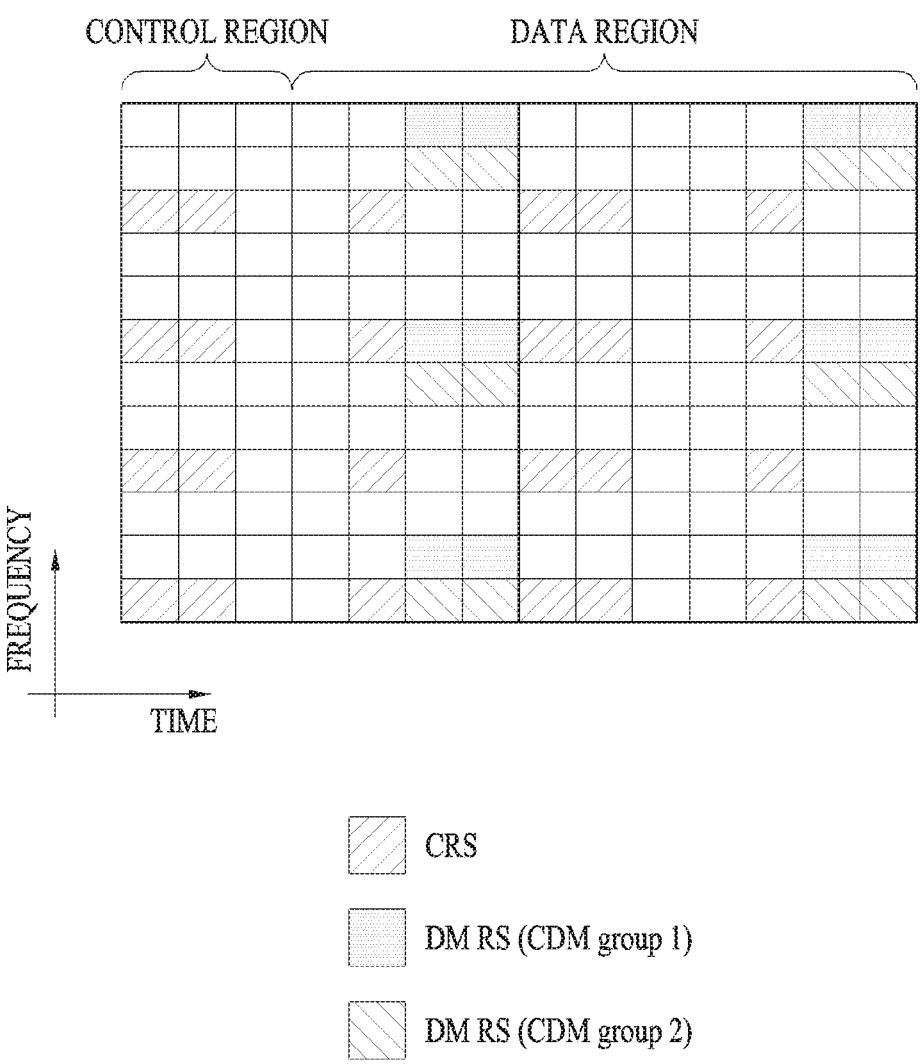
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
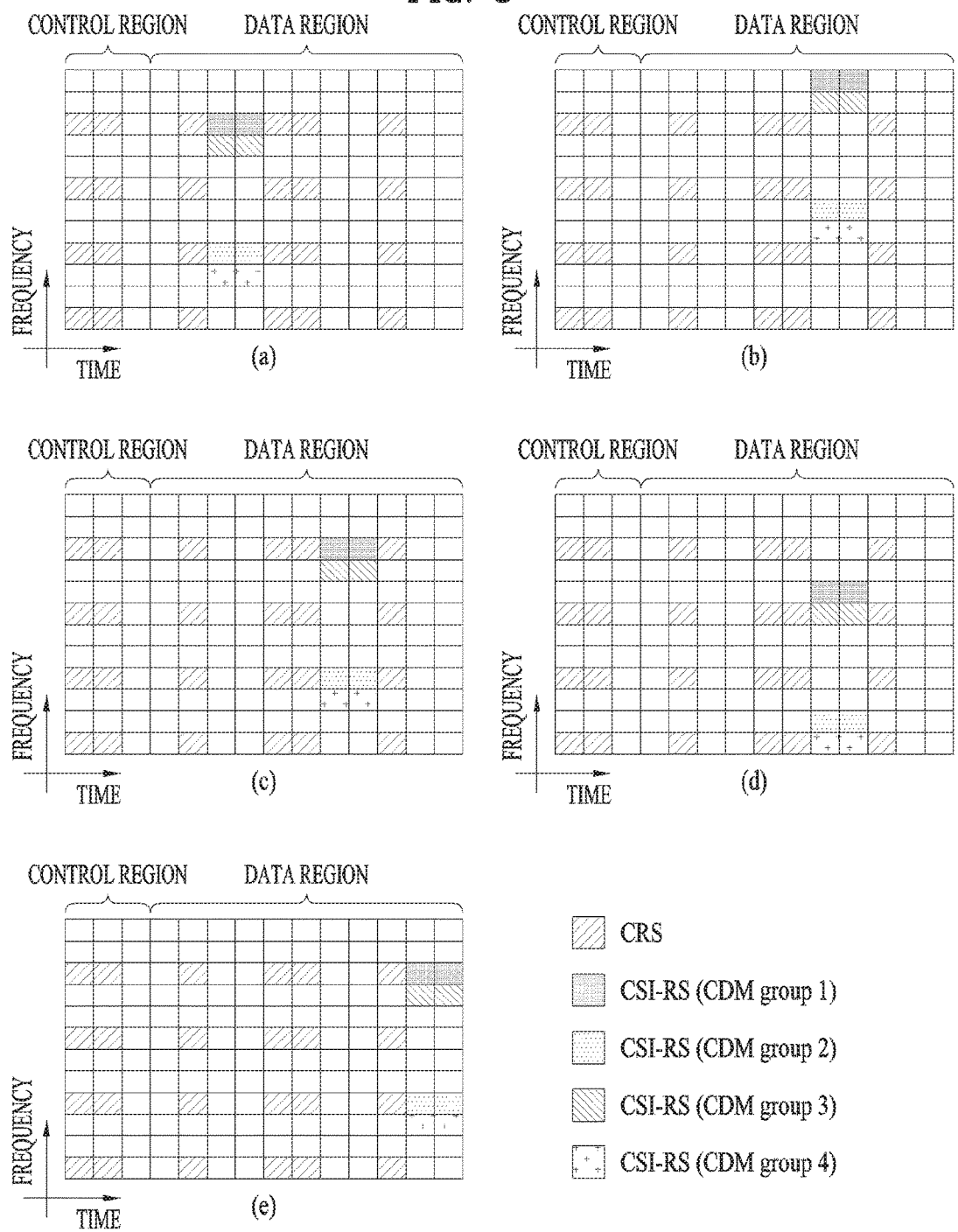
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

RS patterns shown in FIGS. 6 to 8 are disclosed only for illustrative purposes, and the scope or spirit of the present invention are not limited only to a specific RS pattern. That is, even in the case in which RS patterns different from those of FIGS. 6 to 8 are defined and used, various embodiments of the present invention can also be equally applied thereto without difficulty.

CSI-RS Configuration

Among a plurality of CSI-RSs and a plurality of IMRs set to a UE, one CSI process can be defined in a manner of associating a CSI-RS resource for measuring a signal with an interference measurement resource (IMR) for measuring interference. A UE feedbacks CSI information induced from CSI processes different from each other to a network (e.g., base station) with an independent period and a subframe offset.

In particular, each CSI process has an independent CSI feedback configuration. The base station can inform the UE of the CS-RS resource, the IMR resource association information and the CSI feedback configuration via higher layer signaling. For example, assume that three CSI processes shown in Table 1 are set to the UE.

TABLE 1

| CSI Process | Signal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from a cell 1 corresponding to a serving cell of a UE and a CSI-RS received from a cell 2 corresponding to a neighbor cell participating in cooperation, respectively. IMRs set to each of the CSI processes shown in Table 1 are shown in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

A cell 1 performs muting in an IMR 0 and a cell 2 performs data transmission in the IMR 0. A UE is configured to measure interference from other cells except the cell 1 in the IMR 0. Similarly, the cell 2 performs muting in an IMR 1 and the cell 1 performs data transmission in the IMR 1. The UE is configured to measure interference from other cells except the cell 2 in the IMR 1. The cell 1 and the cell 2 perform muting in an IMR 2 and the UE is configured to measure interference from other cells except the cell 1 and the cell 2 in the IMR 2.

Hence, as shown in Table 1 and Table 2, if data is received from the cell 1, CSI information of the CSI process 0 indicates optimized RI, PMI and CQI information. If data is received from the cell 2, CSI information of the CSI process 1 indicates optimized RI, PMI and CQI information. If data is received from the cell 1 and there is no interference from the cell 2, CSI information of the CSI process 2 indicates optimized RI, PMI and CQI information.

It is preferable for a plurality of CSI processes set to a UE to share values subordinate to each other. For example, in case of joint transmission performed by the cell 1 and the cell 2, if a CSI process 1 considering a channel of the cell 1 as a signal part and a CSI process 2 considering a channel of the cell 2 as a signal part are set to a UE, it is able to easily perform JT scheduling only when ranks of the CSI process 1 and the CSI process 2 and a selected subband index are identical to each other.

A period or a pattern of transmitting a CSI-RS can be configured by a base station. In order to measure the CSI-RS, a UE should be aware of CSI-RS configuration of each CSI-RS antenna port of a cell to which the UE belongs thereto. The CSI-RS configuration can include a DL subframe index in which the CSI-RS is transmitted, time-frequency location of a CSI-RS resource element (RE) in a transmission subframe (e.g., the CSI-RS patterns shown in FIGS. 8(a) to 8(e)) and a CSI-RS sequence (a sequence used for a CSI-RS usage, the sequence is pseudo-randomly generated according to a prescribed rule based on a slot number, a cell ID, a CP length and the like), etc. In particular, a plurality of CSI-RS configurations can be used by a random (given) base station and the base station can inform a UE(s) in a cell of a CSI-RS configuration to be used for the UE(s).

Since it is necessary to identify a CSI-RS for each antenna port, resources to which the CSI-RS for each antenna port is transmitted should be orthogonal to each other. As mentioned earlier with reference to FIG. 8, the CSI-RS for each antenna port can be multiplexed by the FDM, the TDM and/or the CDM scheme using an orthogonal frequency resource, an orthogonal time resource and/or an orthogonal code resource.

When the base station informs the UEs in a cell of information on a CSI-RS (CSI-RS configuration), it is necessary for the base station to preferentially inform the UEs of information on time-frequency to which the CSI-RS for each antenna port is mapped. Specifically, information on time can include numbers of subframes in which a CSI-RS is transmitted, a period of transmitting a CSI-RS, a subframe offset of transmitting a CSI-RS, an OFDM symbol number in which a CSI-RS resource element (RE) of a specific antenna is transmitted, etc. Information on frequency can include a frequency space of transmitting a CSI-RS resource element (RE) of a specific antenna, an RE offset on a frequency axis, a shift value, etc.

Figure 9:
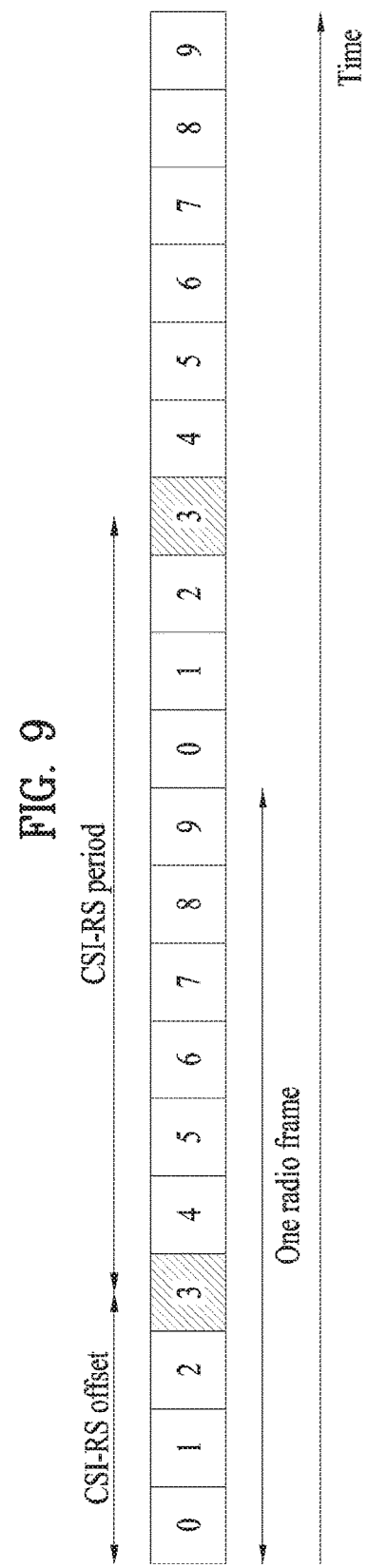
FIG. 9 is a diagram for explaining an example of a scheme of periodically transmitting a CSI-RS.

FIG. 9 is a diagram for explaining an example of a scheme of periodically transmitting a CSI-RS. A CSI-RS can be periodically transmitted with a period of an integer multiple of a subframe (e.g., 5-subframe period, 10-subframe period, 20-subframe period, 40-subframe period or 80-subframe period).

FIG. 9 shows a radio frame configured by 10 subframes (subframe number 0 to 9). In FIG. 9, for example, a transmission period of a CSI-RS of a base station corresponds to 10 ms (i.e., 10 subframes) and a CSI-RS transmission offset corresponds to 3. The offset value may vary depending on a base station to make CSI-RSs of many cells to be evenly distributed in time domain. If a CSI-RS is transmitted with a period of 10 ms, an offset value may have one selected from among 0 to 9. Similarly, if a CSI-RS is transmitted with a period of 5 ms, an offset value may have one selected from among 0 to 4. If a CSI-RS is transmitted with a period of 20 ms, an offset value may have one selected from among 0 to 19. If a CSI-RS is transmitted with a period of 40 ms, an offset value may have one selected from among 0 to 39. If a CSI-RS is transmitted with a period of 80 ms, an offset value may have one selected from among 0 to 79. The offset value corresponds to a value of a subframe in which CSI-RS transmission starts by a base station transmitting a CSI-RS with a prescribed period. If the base station informs a UE of a transmission period of a CSI-RS and an offset value, the UE is able to receive the CSI-RS of the base station at a corresponding subframe position using the transmission period and the offset value. The UE measures a channel through the received CSI-RS and may be then able to report such information as a CQI, a PMI and/or an RI (rank indicator) to the base station. In the present disclosure, the CQI, the PMI and/or the RI can be commonly referred to as CQI (or CSI) except a case of individually explaining the CQI, the PMI and/or the RI. And, the CSI-RS transmission period and the offset can be separately designated according to a CSI-RS configuration.

Figure 10:
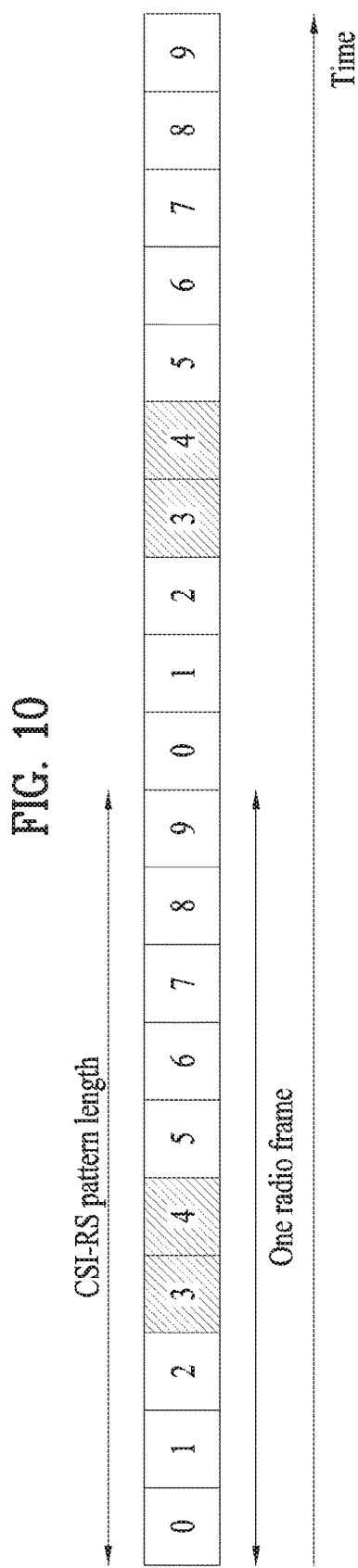
FIG. 10 is a diagram for explaining an example of a scheme of aperiodically transmitting a CSI-RS.

FIG. 10 is a diagram for explaining an example of a scheme of aperiodically transmitting a CSI-RS. In FIG. 10, for example, one radio frame is configured by 10 subframes (subframe number 0 to 9). As shown in FIG. 10, a subframe in which a CSI-RS is transmitted can be represented as a specific pattern. For example, a CSI-RS transmission pattern can be configured by a 10-subframe unit and whether to transmit a CSI-RS can be indicated by a 1-bit indicator in each subframe. An example of FIG. 10 shows a pattern of transmitting a CSI-RS in a subframe index 3 and 4 among 10 subframes (subframe index 0 to 9). The indicator can be provided to a UE via higher layer signaling.

As mentioned in the foregoing description, configuration of CSI-RS transmission can be variously configured. In order to make a UE properly receive a CSI-RS and perform channel measurement, it is necessary for a base station to inform the UE of CSI-RS configuration. Embodiments of the present invention for informing a UE of CSI-RS configuration are explained in the following.

Method of Indicating CSI-RS Configuration

In general, a base station is able to inform a UE of CSI-RS configuration by one of two schemes in the following.

A first scheme is a scheme that a base station broadcasts information on CSI-RS configuration to UEs using dynamic broadcast channel (DBCH) signaling.

In a legacy LTE system, when a base station informs UEs of contents on system information, the information is transmitted to the UEs via a BCH (broadcasting channel). Yet, if the contents are too much and the BCH is unable to carry all of the contents, the base station transmits the system information using a scheme used for transmitting a general downlink data. And, PDCCH CRC of corresponding data is transmitted in a manner of being masked using SI-RNTI, i.e., system information RNTI, instead of a specific UE ID (e.g., C-RNTI). In this case, actual system information is transmitted to a PDSCH region together with a general unicast data. By doing so, all UEs in a cell decode PDCCH using the SI-RNTI, decode PDSCH indicated by the corresponding PDCCH and may be then able to obtain the system information. This type of broadcasting scheme may be referred to as a DBCH (dynamic BCH) to differentiate it from a general broadcasting scheme, i.e., PBCH (physical BCH).

Meanwhile, system information broadcasted in a legacy LTE system can be divided into two types. One is a master information block (MIB) transmitted on the PBCH and another one is a system information block (SIB) transmitted on a PDSCH region in a manner of being multiplexed with a general unicast data. In the legacy LTE system, since informations transmitted with an SIB type 1 to an SIB type 8 (SIB1 to SIB8) are already defined, it may be able to define a new SIB type to transmit information on a CSI-RS configuration corresponding to new system information not defined in the legacy SIB types. For example, it may be able to define SIB9 or SIB10 and the base station can inform UEs within a cell of the information on the CSI-RS configuration via the SIB9 or the SIB10 using a DBCH scheme.

A second scheme is a scheme that a base station informs each UE of information on CSI-RS configuration using RRC (radio resource control) signaling. In particular, the information on the CSI-RS can be provided to each of the UEs within a cell using dedicated RRC signaling. For example, in the course of establishing a connection with the base station via an initial access or handover of a UE, the base station can inform the UE of the CSI-RS configuration via RRC signaling. Or, when the base station transmits an RRC signaling message, which requires channel status feedback based on CSI-RS measurement, to the UE, the base station can inform the UE of the CSI-RS configuration via the RRC signaling message.

Indication of CSI-RS Configuration

A random base station may use a plurality of CSI-RS configurations and the base station can transmit a CSI-RS according to each of a plurality of the CSI-RS configurations to a UE in a predetermined subframe. In this case, the base station informs the UE of a plurality of the CSI-RS configurations and may be able to inform the UE of a CSI-RS to be used for measuring a channel state for making a feedback on a CQI (channel quality information) or CSI (channel state information).

Embodiments for a base station to indicate a CSI-RS configuration to be used in a UE and a CSI-RS to be used for measuring a channel are explained in the following.

Figure 11:
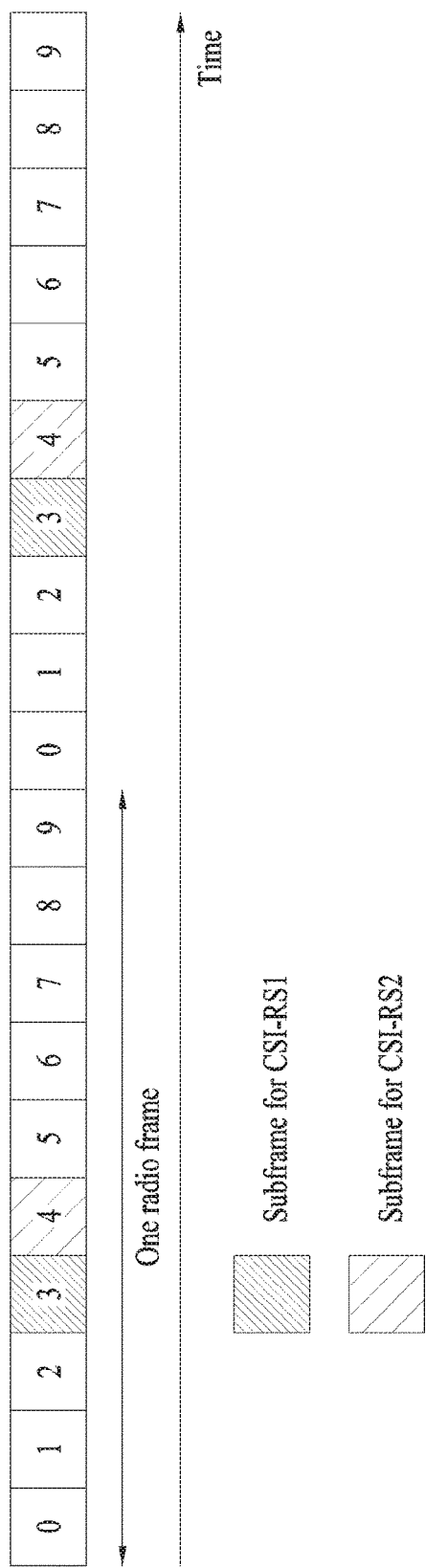
FIG. 11 is a diagram for explaining an example of using two CSI-RS configurations.

FIG. 11 is a diagram for explaining an example of using two CSI-RS configurations. In FIG. 11, for example, one radio frame is configured by 10 subframes (subframe number 0 to 9). In FIG. 11, in case of a first CSI-RS configuration, i.e., a CSI-RS1, a transmission period of a CSI-RS is 10 ms and a transmission offset of a CSI-RS is 3. In FIG. 11, in case of a second CSI-RS configuration, i.e., a CSI-RS2, a transmission period of a CSI-RS is 10 ms and a transmission offset of a CSI-RS is 4. A base station informs a UE of information on two CSI-RS configurations and may be able to inform the UE of a CSI-RS configuration to be used for CQI (or CSI) feedback among the two CSI-RS configurations.

If the base station asks the UE to make a CQI feedback on a specific CSI-RS configuration, the UE can perform channel state measurement using a CSI-RS belonging to the CSI-RS configuration only. Specifically, a channel state is determined based on CSI-RS reception quality, an amount of noise/interference and a function of a correlation coefficient. In this case, the CSI-RS reception quality is measured using the CSI-RS belonging to the CSI-RS configuration only. In order to measure the amount of noise/interference and the correlation coefficient (e.g., an interference covariance matrix indicating interference direction, etc.), measurement can be performed in a subframe in which the CSI-RS is transmitted or a subframe designated in advance. For example, in the embodiment of FIG. 11, if the base station asks the UE to make a feedback on the first CSI-RS configuration (CSI-RS1), the UE measures reception quality using a CSI-RS transmitted in a fourth subframe (a subframe index 3) of a radio frame and the UE can be separately designated to use an add number subframe to measure the amount of noise/interference and the correlation coefficient. Or, it is able to designate the UE to measure the CSI-RS reception quality, the amount of noise/interference and the correlation coefficient in a specific single subframe (e.g., a subframe index 3) only.

For example, reception signal quality measured using a CSI-RS can be simply represented by SINR (signal-to-interference plus noise ratio) as S/(I+N) (in this case, S corresponds to strength of a reception signal, I corresponds to an amount of interference and N corresponds to an amount of noise). The S can be measured through a CSI-RS in a subframe including the CSI-RS in a subframe including a signal transmitted to a UE. Since the I and the N change according to an amount of interference received from a neighbor cell, direction of a signal received from a neighbor cell, and the like, the I and the N can be measured by a CRS transmitted in a subframe in which the S is measured or a separately designated subframe, etc.

In this case, the amount of noise/interference and the correlation coefficient can be measured in a resource element (RE) in which a CRS belonging to a corresponding subframe or a CSI-RS is transmitted. Or, in order to easily measure noise/interference, the noise/interference can be measured through a configured null RE. In order to measure noise/interference in a CRS or CSI-RS RE, a UE preferentially recovers a CRS or a CSI-RS and subtracts a result of the recovery from a reception signal to make a noise and interference signal to be remained only. By doing so, the UE is able to obtain statistics of noise/interference from the remained noise and the interference signal. A null RE may correspond to an empty RE (i.e., transmission power is 0 (zero)) in which no signal is transmitted by a base station. The null RE makes other base stations except the corresponding base station easily measure a signal. In order to measure an amount of noise/interference, it may use all of a CRS RE, a CSI-RS RE and a null RE. Or, a base station may designate REs to be used for measuring noise/interference for a UE. This is because it is necessary to properly designate an RE to be used for measuring noise/interference measured by the UE according to whether a signal of a neighbor cell transmitted to the RE corresponds to a data signal or a control signal. Since the signal of the neighbor cell transmitted to the RE varies according to whether or not synchronization between cells is matched, a CRS configuration, a CSI-RS configuration and the like, the base station identifies the signal of the neighbor cell and may be able to designate an RE in which measurement is to be performed for the UE. In particular, the base station can designate the UE to measure noise/interference using all or a part of the CRS RE, the CSI-RS RE and the null RE.

For example, the base station may use a plurality of CSI-RS configurations and may be able to inform the UE of a CSI-RS configuration to be used for CQI feedback and a null RE position while informing the UE of one or more CSI-RS configurations. In order to distinguish the CSI-RS configuration to be used for CQI feedback by the UE from a null RE transmitted by zero transmission power, the CSI-RS configuration to be used for CQI feedback by the UE may correspond to a CSI-RS configuration transmitted by non-zero transmission power. For example, if the base station informs the UE of a CSI-RS configuration in which the UE performs channel measurement, the UE can assume that a CSI-RS is transmitted by non-zero transmission power in the CSI-RS configuration. In addition, if the base station informs the UE of a CSI-RS configuration transmitted by zero transmission power (i.e., null RE position), the UE can assume that an RE position of the CSI-RS configuration corresponds to zero transmission power. In other word, when the base station informs the UE of a CSI-RS configuration of non-zero transmission power, if there exists a CSI-RS configuration of zero transmission power, the base station can inform the UE of a corresponding null RE position.

As a modified example of the method of indicating a CSI-RS configuration, the base station informs the UE of a plurality of CSI-RS configurations and may be able to inform the UE of all or a part of CSI-RS configurations to be used for CQI feedback among a plurality of the CSI-RS configurations. Hence, having received a request for CQI feedback on a plurality of the CSI-RS configurations, the UE measures a CQI using a CSI-RS corresponding to each CSI-RS configuration and may be then able to transmit a plurality of CQI information to the base station.

Or, in order to make the UE transmit a CQI for each of a plurality of the CSI-RS configurations, the base station can designate an uplink resource, which is necessary for the UE to transmit the CQI, in advance according to each CSI-RS configuration. Information on the uplink resource designation can be provided to the UE in advance via RRC signaling.

Or, the base station can dynamically trigger the UE to transmit a CQI for each of a plurality of CSI-RS configurations to the base station. Dynamic triggering of CQI transmission can be performed via PDCCH. It may inform the UE of a CSI-RS configuration for which a CQI is to be measured via PDCCH. Having received the PDCCH, the UE can feedback a CQI measurement result measured for the CSI-RS configuration designated by the PDCCH to the base station.

A transmission timing of a CSI-RS corresponding to each of a plurality of the CSI-RS configurations can be designated to be transmitted in a different subframe or an identical subframe. If CSI-RSs according to CSI-RS configurations different from each other are designated to be transmitted in an identical subframe, it may be necessary to distinguish the CSI-RSs from each other. In order to distinguish the CSI-RSs according to the CSI-RS configurations different from each other, it may be able to differently apply at least one selected from the group consisting of a time resource, a frequency resource and a code resource of CSI-RS transmission. For example, an RE position in which a CSI-RS is transmitted can be differently designated in a subframe according to a CSI-RS configuration (e.g., a CSI-RS according to one CSI-RS configuration is designated to be transmitted in an RE position shown in FIG. 8 (a) and a CSI-RS according to another CSI-RS configuration is designated to be transmitted in an RE position shown in FIG. 8 (b)) (distinction using a time and frequency resource). Or, if CSI-RSs according to CSI-RS configurations different from each other are transmitted in an identical RE position, the CSI-RSs can be distinguished from each other by differently using a CSI-RS scrambling code in the CSI-RS configurations different from each other (distinction using a code resource).

Quasi Co-Located (QC)

A UE can receive data from a plurality of transmission points (TPs) (e.g., a TP1 and a TP2). Hence, the UE is able to transmit channel state information on a plurality of the TPs. In this case, RSs can also be transmitted to the UE from a plurality of the TPs. In this case, if it is able to share properties for channel estimation from RS ports different from each other of TPs different from each other, it may be able to reduce load and complexity of reception processing of the UE. Moreover, if it is able to share properties for channel estimation from RS ports different from each other of an identical TP between the RS ports, it may be able to reduce load and complexity of reception processing of the UE. Hence, LTE-A system proposes a method of sharing properties for channel estimation between RS ports.

For channel estimation between RS ports, LTE-A system has introduced such a concept as "quasi co-located (QLC)". For example, if two antenna ports are quasi co-located (QC), the UE may assume that large-scale properties of the signal received from the first antenna port can be inferred from the signal received from the other antenna port". In this case, the large-scale properties can include at least one selected from the group consisting of delay spread, Doppler spread, Doppler shift, average gain and average delay. In the following, the quasi co-located is simply referred to as QCL.

In particular, if two antenna ports are QCL, it may indicate that large-scale properties of a radio channel received from one antenna port are identical to large-scale properties of a radio channel received from another antenna port. If antenna ports transmitting RSs different from each other are QCL, large-scale properties of a radio channel received from one antenna port of a type can be replaced with large-scale properties of a radio channel received from one antenna port of a different type.

According to the aforementioned QCL concept, a UE is unable to assume large-scale channel properties identical to each other between radio channels received from non-QCL (NQC) antenna ports. In particular, in this case, a UE should perform an independent processing according to each configured non-QCL antenna port to obtain timing acquisition and tracking, frequency offset estimation and compensation, delay estimation, and Doppler estimation and the like.

A UE can perform operations in the following between antenna ports capable of assuming QCL. First of all, the UE can use delay spread, Doppler spectrum, Doppler spread estimation result for a radio channel received from an antenna port when a channel is estimated for a radio channel received from a different antenna port. Secondly, regarding frequency shift and received timing, after time synchronization and frequency synchronization for a single antenna port are performed, the UE can apply identical synchronization to demodulation of a different antenna port. Thirdly, regarding average received power, the UE can average RSRP (reference signal received power) measurements for over two or more antenna ports.

If a UE receives a DMRS-based DL-related DCI format via a control channel (PDCCH or EPDCCH), the UE performs channel estimation for a corresponding PDSCH via a DM-RS sequence and performs data demodulation. If DMRS port configuration received from a DL scheduling grant is capable of being QCL with a CRS port, the UE can apply the large-scale channel properties estimation estimated from the CRS port as it is in case of estimating a channel via the DMRS port. This is because a CRS corresponds to a reference signal broadcasted in every subframe with relatively high density over a whole band, the estimation on the large-scale channel properties can be more stably obtained from the CRS. On the contrary, since a DMRS is UE-specifically transmitted for a specific scheduled RB and a precoding matrix, which is used by a base station for transmission, may vary according to a PRG unit, an effective channel received by the UE may vary according to the PRG unit. Hence, if a DMRS is used for estimating the large-scale channel properties of a radio channel over a wide band, performance degradation may occur. In case of a CSI-RS, since the CSI-RS has a relatively long transmission period and a relatively low density, if the CSI-RS is used for estimating the large-scale channel properties of the radio channel, performance degradation may occur.

In particular, QCL assumption between antenna ports can be utilized for receiving various DL reference signals, estimating a channel, reporting a channel state and the like.

Method of Cancelling Interference According to the Present Invention

In a wireless communication system, there is a NAICS (Network assisted Interference Cancellation and Suppression) scheme corresponding to one of inter-cell interference mitigation schemes. For example, in order to reduce downlink interference of a neighbor cell, a technology for a UE to remove a transmission signal of the neighbor cell from a symbol level (SLIC) is under discussion. A UE is able to receive data with high SINR as much as removed interference. This may indicate that the UE is able to promptly receive data with a transfer rate higher than a legacy transfer rate.

Figure 12:
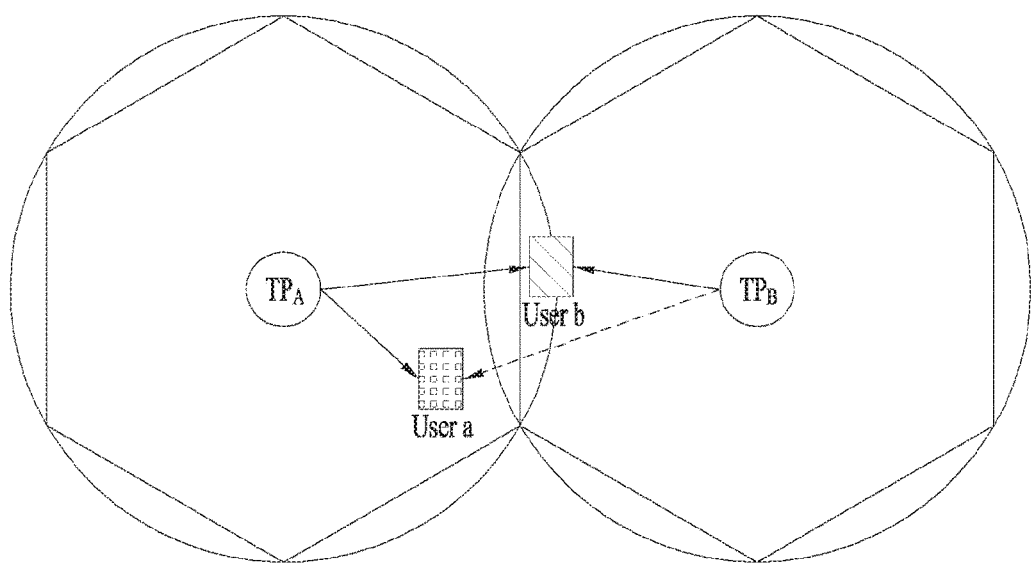
FIG. 12 is a diagram for general interference environment of a downlink system.

FIG. 12 is a diagram for general interference environment of a downlink system.

For clarity, a cell controlled by a TP A is called a cell A and a user communicating with the TP A is called a UE a. Similarly, there exist a cell B and a UE b with respect to a neighboring TP B. Since the cell A and the cell B use a same radio resource, the UE b corresponding to a user located at the cell edge receives interference from the cell A. In the following, the cell A is referred to as an interfering cell, the TP A is referred to as an interfering TP, the cell B is referred to as a serving cell, the TP B is referred to as a serving TP, and the UE b is referred to as an NAICS UE. The NAICS UE can increase a data reception rate by removing an interference signal received from the interfering cell.

In order for a UE to cancel interference and receive data with a high transfer rate, unlike a legacy scheme, it is important for the UE to feedback a CQI of which interference is partially or completely removed to a base station. In the following, the CQI is referred to as a NAICS CQI. A method for a UE to measure interference power for calculating the NAICS CQI by utilizing an IMR is explained in the following.

An IMR exists over the full band with a period of a specific subframe. Interference strength of an interfering cell affecting a UE may vary according to each RB in a subframe at which an IMR exists. For example, if the interfering cell does not transmit any data in an RB 1, the UE may operate with no interference. If the interfering cell transmits data in an RB 2, interference may affect the UE. If the interfering cell transmits data in an RB 3 and an RB 4 and uses a high modulation in the RB 3, the UE may incorrectly perform interference cancellation. If the interfering cell uses a low modulation in the RB 4, the UE can correctly perform interference cancellation. As a result, residual interference powers remained in the RB 3 and the RB 4 become different after the UE performs NAICS.

As mentioned in the foregoing description, whether or not there exists interference per RB may vary according to a traffic load of an interfering cell. Although interference cancellation is performed in an RB at which interference exists, residual interference power may vary according to an RB. Hence, when a UE measures interference for calculating a NAICS CQI in an IMR, it may be efficient to measure the interference in a manner of reflecting residual interference existing after the NAICS to the IMR according to each RB.

To this end, a UE may be able to differentiate a method of measuring interference from an IMR in each RB in consideration of two things described in the following.

First of all, it is necessary for a UE to identify whether or not an interfering cell has data and differentiate a method of measuring interference at an IMR according to whether or not there exists data. In particular, if data of the interfering cell exists in each RB, the UE should measure interference power of which interference is partially or completely removed by NAICS from an IMR. If data of the interfering cell does not exist, the UE should measure interference power of which interference from the interfering cell does not exist.

Secondly, the UE should differentiate a method of measuring interference at an IMR according to a signal transmitted by the interfering cell in an IMR RE of each RB. In particular, a method of measuring interference can be differentiated according to a CSI-RS, data, or muting transmitted/performed by the interfering cell in the IME RE.

The UE measures interference at an IMR according to each RB in accordance with the method of the present invention in consideration of the aforementioned two things and calculates a NAICS CQI in a manner of averaging interferences measured from each RB.

In particular, the UE can differentiate an interference measurement scheme according to whether or not data of the interfering cell exists in an RB and a type of a signal transmitted by the interfering cell in an IMR RE of the RB.

Table 3 shows a desired UE behavior at an interfering cell according to whether or not data of an interfering cell exists in a specific RB and a type of a signal transmitted by the interfering cell in an IMR RE of the RB. In the following, each of cases is explained in detail.

TABLE 3

| Case | Whether or not data of interfering cell exist | Type of signal transmitted by interfering cell at IMR RE | Desired UE behavior at IMR RE |
|---|---|---|---|
| 1 | ○ | Data | Data-IC, and then interference power measure |
| 2 | ○ | Muting | Alt 1. Interference power measure<br>Alt 2. adding residual interference, and then interference power measure |
| 3 | ○ | CSI-RS | Alt 1. CSI-RS-IC, and then interference power measure<br>Alt 2. No measurement at the IMR |
| 4 | X | Data | Not occurring case |
| 5 | X | Muting | interference power measure |
| 5 | X | CSI-RS | Alt 1. CSI-RS-IC, and then interference power measure<br>Alt 2. No measurement at the IMR |

First of all, case 1 of Table 3 is explained.

An interfering cell transmits data in a specific RB at which an IMR exists and transmits data at an IMR RE of the RB as well.

In this case, a UE detects a reception signal of the interfering cell at the IMR RE and regenerates an interference signal. Subsequently, the UE subtracts the regenerated interference signal from the signal received at the IMR RE and then measures interference power for calculating a NAICS CQI.

By doing so, the UE can calculate an accurate NAICS CQI to which interference cancellation capability of the UE is reflected. In particular, if the UE is able to completely cancel interference using desired signal power, interference power, PMI of an interference signal, MCS of an interference signal and the like provided in current channel environment, the UE calculates a CQI of which interference of the interfering cell is completely cancelled. If the UE is unable to completely cancel interference, the UE calculates a CQI that residual interference of the interfering cell exists.

Secondly, case 2 of Table 3 is explained.

An interfering cell transmits data in a specific RB at which an IMR exists and transmits no signal at an IMR RE of the RB. (In particular, interference of the interfering cell is 0 at the IME RE.) In this case, the UE is able to perform one of the following two operations.

As a first operation of the case 2, the UE can perform interference measurement. The UE does not add any additional action at the IMR of the RB and measures interference power. In particular, the UE assumes that the UE is able to completely remove interference data existing in the RB and measures interference power at the IMR where the interference from the interfering cell does not exist.

As a second operation of the case 2, the UE can measure interference after adding residual interference. In case of the aforementioned first operation, the UE calculates a NAICS CQI of which interference from the interfering cell is completely cancelled in the RB. However, although NAICS is performed, residual interference may exist depending on interference cancellation capability of the UE. In order to reflect the residual interference, the UE adds a random interference signal to a signal received at the IMR RE and then measures interference power. In this case, since the added interference signal corresponds to residual interference, it may be preferable to have power smaller than reception power of interference data as small as epsilon times. As a different method, in order to reflect residual interference, the UE measures interference power using an operation similar to the first operation and adds residual interference power anticipated after the NAICS.

Thirdly, case 3 of Table 3 is explained.

An interfering cell transmits data in a specific RB at which an IMR exists and transmits a CSI-RS at an IMR RE of the RB. In this case, the UE is able to perform one of the following two operations.

As a first operation of the case 3, the UE removes interference of a CSI-RS and then measures interference.

The UE detects a CSI-RS reception signal of the interfering cell at the IMR of the RB and regenerates the CSI-RS reception signal. Subsequently, the UE subtracts the CSI-RS reception signal regenerated at the IMR and then measures interference power for calculating a NAICS CQI.

Although the UE performs the aforementioned operation, it is difficult for the UE to calculate an accurate NAICS CQI to which interference cancellation capability of the UE is reflected. This is because, since an interference CSI-RS instead of interference data exists at the IMR RE, the interference cancellation capability of the UE is not reflected to the IMR and interference CSI-RS cancellation capability is reflected to the IMR. Hence, in case of a case 3 described in the following, it may be preferable for the UE not to measure interference power at the IMR.

As a second operation of the case 3, the UE may not measure interference in the IMR.

Fourthly, case 4 of Table 3 is explained.

An interfering cell does not transmit data in a specific RB at which an IMR exists and does not transmit a signal at an IMR RE of the RB. In this case, since the interfering cell makes no data interference, a UE measures interference power of which interference from the interfering cell is 0. In this case, interference from other cell may still exist. Since the interfering cell does not transmit a signal at the IMR RE, the UE does not add any additional action at the IMR of the RB and measures interference power.

Fifthly, case 5 of Table 3 is explained.

An interfering cell does not transmit data in a specific RB at which an IMR exists and transmits a CSI-RS at an IMR RE of the RB. In this case, the UE is able to perform one of the following two operations.

As a first operation of the case 5, the UE removes CSI-RS interference and then measures interference.

The UE detects a CSI-RS reception signal of the interfering cell at the IMR of the RB and regenerates the CSI-RS reception signal. Subsequently, the UE subtracts the CSI-RS reception signal regenerated at the IMR and then measures interference power for calculating a NAICS CQI.

If the UE fails to accurately regenerate the CSI-RS reception signal, although the CSI-RS reception signal is subtracted at the IMR, residual CSI-RS interference exists. Hence, if the residual CSI-RS interference is still big after the aforementioned operation is performed, the UE calculates a NAICS CQI in which the interference from the interfering cell exists. Hence, in case of a case 5 described in the following, it may be preferable for the UE not to measure interference power at the IMR.

As a second operation of the case 5, the UE does not perform measurement in the IMR.

In the case 3 and the case 5, if a CSI-RS exists at the IMR RE, it may be difficult to calculate an accurate NAICS CQI. Hence, it may be preferable to restrict the interfering cell not to set a CSI-RS to the IMR RE, which is utilized for a usage of calculating a NAICS CQI. The UE does not expect that the interfering base station transmits a CSI-RS at the IMR RE used for calculating a NAICS CQI.

Method of Determining Case According to each Condition

When the aforementioned 5 cases of Table 3 are put together, a UE determines a case of each RB according to a following condition and may be able to differentiate a method of measuring interference at an IMR according to each RB.

A condition 1 corresponds to a case that an interfering cell transmits a CSI-RS to an IMR.

The condition 1 corresponds to the case 3 or the case 5 of Table 3. The UE measures interference power using an identical scheme irrespective of whether or not there exist interference data in an RB. In particular, the UE measures interference power using the first operation or the second operation of the case 3.

A condition 2 corresponds to a case that an interfering cell sets a ZP CSI-RS to an IMR. The condition 2 can be segmented as follows.

A condition 2-1 corresponds to a case that the interfering cell sets a ZP CSI-RS to the IMR and the UE determines as interference data exists in an RB. In this case, the condition 2-1 corresponds to the case 2 of Table 3. The UE measures interference at the IMR using the first or the second operation of the case 2. If the UE measures interference power using the first operation of the case 2, the interference power is measured by a scheme identical to a condition 2-2. The interference power is measured by the first operation with respect to the condition 2 without separating the condition 2-1 from the condition 2-2.

The condition 2-2 corresponds to a case that the interfering cell sets a ZP CSI-RS to the IMR and the UE determines as interference data does not exist in the RB.

In this case, the condition 2-2 corresponds to the case 4 of Table 3. In particular, the UE immediately measures interference at the IMR without a separate calculation.

A condition 3 corresponds to a case that the interfering cell does not transmit a CSI-RS to the IMR and does not set a ZP CSI-RS to the IMR. The condition 3 can be segmented as follows.

A condition 3-1 corresponds to a case that the interfering cell does transmits a CSI-RS to the IMR and does not set a ZP CSI-RS to the IMR, and the UE determines as interference data does not exist in an RB.

In this case, the condition 3-1 corresponds to the case 4. The UE assumes that the interfering cell mutes at an IMR RE of a corresponding RB. Hence, the UE immediately measures interference at the IMR without any separate calculation.

A condition 3-2 corresponds to a case that the interfering cell does transmits a CSI-RS to the IMR and does not set a ZP CSI-RS to the IMR, and the UE determines as interference data exists in an RB.

In this case, the UE assumes that interference data is transmitted to the IMR RE and may be then able to perform an operation of the case 1.

In the condition 3-2, if the interfering cell does not set a CSI-RS and a ZP CSI-RS to the IMR and the UE determines as interference data exists in an RB, the UE assumes that interference data is transmitted to the IMR RE. Yet, if the interference data transmitted to the RB corresponds to a data of a CoMP UE, it is not mandatory that interference data is always transmitted to the IME RE. The reason is described in the following.

In order for a CoMP UE to estimate channels from a plurality of cells, not only a CSI-RS of a serving cell of the CoMP UE but also a CSI-RS of other cell is set to the CoMP UE. In order to increase accuracy of channel estimation of the CSI-RS of other cell, the CoMP UE performs rate matching on the CSI-RS of other cell as well. In particular, the interfering cell mutes a CSI-RS RE of other cell in an RB in which a CoMP UE of the interfering cell is scheduled. In this case, the CSI-RS of other cell may exist at the outside of a ZP CSI-RS RE of the interfering cell. If the CSI-RS RE of other cell and an IMR RE are overlapped with each other by chance, interference data does not exist at the IMR RE. In particular, the interfering cell mutes at the IMR RE. For example, when a serving cell, a first interfering cell and a second interfering cell exist, the first interfering cell and the second interfering cell perform CoMP. A UE of the first interfering cell should receive a CSI of the second interfering cell as well. The first interfering cell does not transmit data at a CSI-RS position of the second interfering cell. In this case, if the CSI-RS position of the second interfering cell and a position of an IMR are identical to each other, the second interfering cell performs muting.

Hence, for a case that the interfering cell schedules a CoMP UE using a TM 10, it may be preferable to segment the condition 3-2 into a condition 3-2-1 and a condition 3-2-2.

Of course, the UE simply does not segment the condition 3-2 anymore by assuming the following. When the interfering cell transmits data in a specific RB, if a ZP CSI-RS is not set, muting is not performed at an IMR RE of the RB. Or, when the interfering cell transmits data in a specific RB, if a ZP CSI-RS is not set, muting is not performed at all REs of the RB.

The condition 3-2-1 corresponds to a case that the interfering cell does not transmit a CSI-RS to an IMR, does not set a ZP CSI-RS to the IMR, muting is performed, and the UE determines as interference data exists in an RB. In this case, the UE performs the first or the second operation of the case 2. The UE can distinguish the condition 3-2-1 from the condition 3-2-2 only when the UE knows that the interfering cell has performed muting although the interfering cell did not set a ZP CSI-RS at the IMR RE.

The condition 3-2-2 corresponds to a case that the interfering cell does not transmit a CSI-RS to an IMR, does not set a ZP CSI-RS to the IMR, muting is not performed, and the UE determines as interference data exists in an RB. The UE performs an operation of the case 1 under an assumption that interference data is transmitted to an IMR RE.

In order for the UE to check the aforementioned conditions in each RB, it is necessary to have information described in the following.

Figure 13:
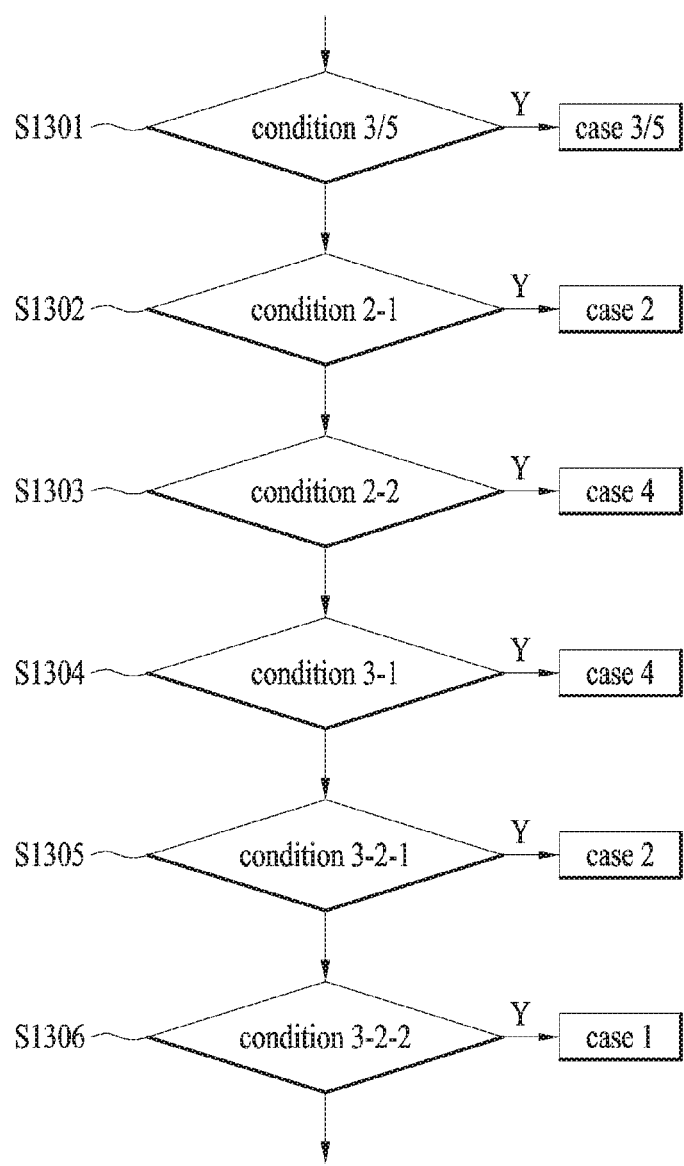
FIG. 13 is a diagram for an example indicating a process for a UE to measure interference power by a type corresponding to a condition.

(1) CSI-RS configuration of the interfering cell
(2) ZP CSI-RS configuration of the interfering cell
(3) Muting RE information of the interfering cell except ZP CSI-RS
(4) Whether or not there exists data transmitted by the interfering cell according to RB FIG. 13 shows an example of a process for a UE to check a condition for the aforementioned four informations and measure interference power using a case corresponding to the condition.

First of all, in the step S1301, the UE checks a condition 1.

The condition 1 corresponds to a case that the interfering cell transmits a CSI-RS to an IMR. If the condition 1 is satisfied, the UE determines it as a case 3 or a case 5.

If the condition 1 is not satisfied, the UE determines whether or not a condition 2-1 is satisfied in the step S1302.

The condition 2-1 corresponds to a case that the interfering cell sets a ZP CSI-RS to the IMR and the UE determines as interference data exists in an RB. If the condition 2-1 is satisfied, the UE determines it as a case 2.

If the condition 2-1 is not satisfied, the UE determines a condition 2-2 in the step S1303.

The condition 2-2 corresponds to a case that the interfering cell sets a ZP CSI-RS to the IMR and the UE determines as interference data does not exist in an RB. If the condition 2-2 is satisfied, the UE determines it as a case 4.

If the condition 2-2 is not satisfied, the UE determines a condition 3-1 in the step S1304.

The condition 3-1 corresponds to a case that the interfering cell does not transmit a CSI-RS to the IMR, does not set a ZP-CSI-RS to the IMR and the UE determines as interference data does not exist in an RB. If the condition 3-1 is satisfied, the UE determines it as a case 4.

If the condition 3-1 is not satisfied, the UE determines a condition 3-2-1 in the step S1305.

The condition 3-2-1 corresponds to a case that the interfering cell does not transmit a CSI-RS to the IMR, does not set a ZP-CSI-RS to the IMR, muting is performed and the UE determines as interference data exists in an RB. If the condition 3-2-1 is satisfied, the UE determines it as a case 2.

If the condition 3-2-1 is not satisfied, the UE determines a condition 3-2-2 in the step S1306.

The condition 3-2-2 corresponds to a case that the interfering cell does not transmit a CSI-RS to the IMR, does not set a ZP-CSI-RS to the IMR, muting is not performed and the UE determines as interference data exists in an RB. If the condition 3-2-2 is satisfied, the UE determines it as a case 1.

The UE receives CRS-related information (cell ID, CRS port, v-shift, MBSFN configuration) of the interfering cell in advance via RRC signaling. Subsequently, the UE additionally receives (1) CSI-RS configuration of the interfering cell, (2) ZP CSI-RS configuration of the interfering cell, (3) muting RE information of the interfering cell except ZP CSI-RS via RRC signaling. In order to obtain (4) information on whether or not there is a data transmitted by the interfering cell according to an RB, the UE may perform BD (blind decoding) or a serving cell of the interfering cell can dynamically inform the UE of the information via PDCCH/ePDCCH.

Method of Obtaining Information Necessary for Cancelling Interference

In the following, examples of a method for a UE to obtain informations necessary for cancelling interference are explained.

First of all, a method for a UE to identify a CSI-RS configuration of an interfering cell based on CRS to CSI-RS QCL mapping information is explained.

The UE is able to know a CSI-RS index QCL with each CRS from the CRS to CSI-RS QCL mapping information. Hence, the UE identifies a CSI-RS index of an interfering cell QCL with a CRS of the interfering cell from the information and may be then able to identify a CSI-RS configuration of the interfering cell.

In communication environment at which distributed RRHs, which share a cell id but physically apart from each other, are deployed, since a CRS and a plurality of CSI-RS indexes are in a relationship of QCL mapping, it is difficult to identify a CSI-RS index used by an interfering RRH. In this case, a UE measures RS power of each of a plurality of CSI-RSs QCL with a CRS of an interfering cell and may be able to determine a CSI-RS of biggest RS power as a CSI-RS of a dominant interfering RRH. A CSI-RS configuration of the interfering RRH is identified from the selected CSI-RS.

Secondly, a method for a UE to identify a ZP CSI-RS configuration of an interfering cell based on the CRS to CSI-RS QCL mapping information and a PQI parameter set is explained in the following.

According to LTE standard (e.g., release-11), a PQI parameter set can include information such as crs-Ports-Count, crs-FreqShift, mbsfn-SubframeConfigList, csi-RS-ConfigZPId, pdsch-Start, and qcl-CSI-RS-ConfigNZPId.

PQI information corresponds to one of informations introduced to support DL CoMP. A UE is able to know CSI-RS information QCL with a transmission DMRS and rate matching information (ZP CSI-RS configuration, number of PDCCH symbols, CRS configuration, and MBSFN configuration) via the PQI. The PQI information is indicated via 2-bit PQI field in a DCI 2D. To this end, a base station informs a UE of four PQI parameter sets corresponding to a PQI value of 2 bits in advance via RRC signaling. A PQI parameter set consists of a CSI-RS index and rate matching information.

Having identified a CSI-RS index of the interfering cell, the UE identifies a ZP CSI-RS of the interfering cell using the PQI parameter set received from the base station. In particular, the UE searches for a PQI parameter set including the CSI-RS index of the interfering cell and determines a ZP CSI-RS existing in the PQI parameter set as the ZP CSI-RS of the interfering cell.

If there are a plurality of PQI parameter sets including the CSI-RS index of the interfering cell and each of a plurality of the PQI parameter sets is configured by a ZP CSI-RS different from each other, it is difficult to search for the ZP CSI-RS of the interfering cell using the aforementioned scheme. Hence, the UE assumes that PQI parameter sets including an identical CSI-RS always have an identical ZP CSI-RS. In order for the base station to guarantee the assumption, it may be preferable to configure a PQI parameter set including an identical CSI-RS to have an identical ZP CSI-RS all the time.

Thirdly, a method for a UE to identify a muting RE of an interfering cell except a ZP CSI-RS of the interfering cell from CSI-RS candidates information used for rate matching is explained.

As mentioned earlier in the second method, a base station can inform a UE of ZP CSI-RS information per CSI-RS via a PQI parameter set. Similarly, the base station can inform the UE of a list of CSI-RS candidates used for rate matching according to a CSI-RS.

The interfering cell identifies CSI-RSs capable of being set to CoMP UEs of the interfering cell and delivers a list of the CSI-RSs to a serving cell via backhaul. The serving cell informs the UE of the list of the CSI-RSs together with the CSI-RS index of the interfering cell via RRC signaling.

For example, it may be able to add the list of the CSI-RSs to the PQI parameter set and inform the UE of the PQI parameter set. Hence, one PQI parameter set indicates the list of CSI-RSs as well as one CSI-RS index and one ZP CSI-RS index.

The UE identifies a CSI-RS of the interfering cell using the CRS to CSI-RS QCL mapping with the scheme mentioned above and checks a list of CSI-RS candidates used for rate matching corresponding to the CSI-RS of the interfering cell. A plurality of CSI-RS lists may exist in a PQI parameter set. In this case, the UE assumes rate matching of the interfering cell by a union of a plurality of the lists or performs blind detection on interference data by assuming CSI-RS rate matching of the interfering cell with respect to each of a plurality of the lists.

The UE can assume that the interfering cell has performed muting on all CSI-RS REs included in a list of CSI-RSs.

Yet, it may be able to mute a CSI-RS RE included in the list of CSI-RSs or transmit a data according to UE scheduling of the interfering cell. Since the UE is unable to know whether or not an IMR RE is muted or data exists, the UE can use a method described in the following rather than the assuming scheme that the interfering cell has performed muting on all CSI-RS REs included in a list of CSI-RSs. If a random CSI-RS RE included in the CSI-RS list is overlapped with an IMR RE, the UE may not measure interference from the IMR RE. Or, if a random CSI-RS RE included in the CSI-RS list is overlapped with an IMR RE, the UE does not define a method of measuring interference at the IMR RE and the method can be differently determined depending on an implementation of the UE.

Since the interfering cell performs dynamic scheduling in every subframe, it is preferable to dynamically signal 'muting RE information except the ZP CSI-RS of the interfering cell'. If an ideal backhaul of which a backhaul delay is low is constructed between the interfering cell and a serving cell, the information is received from the serving cell. Otherwise, the information can be received from the interfering cell via DCI.

The UE is able to know an RE at which rate matching on data of the interfering cell is to be performed via the aforementioned first to third signaling. The UE can use the information not only for calculating a NAICS CQI but also for estimating and regenerating interference data to perform NAICS. For example, when the UE performs blind detection (BD) on PMI, a modulation order, and the like for transmission data of the interfering cell, it is able to identify an RE to which interference data is transmitted using a CSI-RS of the interfering cell, ZP CSI-RS and other rate matching information obtained by the aforementioned first to third method and perform the BD on the RE only, thereby enhancing BD performance.

Method of Simplifying Interference Measurement

Referring to Table 3, as an interfering cell transmits data or a CSI-RS to an IMR RE and performs muting, various operations are enabled. As a result, an interference measurement scheme of a UE has become complex. More simply, if an operation of the interfering cell is restricted at the IMR RE, the interference measurement scheme of the UE can be simplified.

As a first example, it may be able to restrict the interfering cell to perform muting on the IME RE all the time. The interfering cell sets a ZP CSI-RS to the IMR RE and the UE determines whether or not there is interference data in an RB only. By doing so, it is able to determine a case 2 or 4.

As a second example, it may be able to restrict the interfering cell to transmit interference data to the IMR RE all the time. In this case, the interfering cell does not set a CSI-RS to the IMR RE. And, a CSI-RS existing at the IMR RE should not be set to a CoMP UE of the interfering cell. Moreover, the interfering cell does not set a ZP CSI-RS to the IMR RE. Although data is not transmitted to an RB, dummy data is transmitted to the IMR RE. The dummy data is transmitted by a specific precoder, modulation, a rank, a transmission mode and transmit power promised between the UE and the interfering cell. The UE regenerates the received dummy data and subtracts the regenerated dummy data from IMR and then measures interference power. Or, the interfering cell sets a ZP CSI-RS to the IMR RE and practically transmits dummy data to the IMR RE all the time. Since the RE to which the ZP CSI-RS is set receives data after rate matching is performed, the UE of the interfering cell is not affected by the dummy data. The interfering cell transmits the dummy data to the ZP CSI-RS by a specific precoder, modulation, a rank, a transmission mode and transmit power promised between the interfering cell and a serving cell UE. The UE regenerates the received dummy data irrespective of whether or not there is data of the interfering cell in an RB, subtracts the regenerated dummy data from IMR, and then measures interference power.

Method of Cancelling Interference Channel Power

According to the aforementioned embodiments, the UE estimates and regenerates a signal received from the interfering cell and subtracts the regenerated signal from the IMR RE. In particular, the UE performs CSI-RS-IC or Data-IC according to cases shown in Table 3. Yet, the aforementioned calculation increases complexity when the UE calculates a CQI. Moreover, when the UE calculates a wideband CQI for the full band, since the IC is performed on the full band, considerable calculation complexity is required.

In order to reduce the complexity, the present invention proposes to cancel power of an estimated interference channel instead of cancelling an interference signal. Hence, Table 4 is proposed in the following in a manner of modifying Table 3. Modified parts of Table 3 are underlined.

TABLE 4

| Case | Whether or not data of interfering cell exist | Type of signal transmitted by interfering cell at IMR RE | Desired UE behavior at IMR RE |
|---|---|---|---|
| 1 | O | Data | interference power measure and then subtract estimated interference power |
| 2 | O | Muting | Alt 1. Interference power measure<br>Alt 2. interference power measure and then adding residual interference power |
| 3 | O | CSI-RS | Alt 1. interference power measure and then subtract estimated CSI-RS power<br>Alt 2. No measurement at the IMR |
| 0 | X | Data | Not occurring case |
| 4 | X | Muting | interference power measure |
| 5 | X | CSI-RS | Alt 1. interference power measure and then subtract estimated CSI-RS power<br>Alt 2. No measurement at the IMR |

A UE estimates an interference channel from an RS of an interfering cell and calculates power of the estimated interference channel. In the following, the power of the interference channel is referred to as Q.

Referring to a case 1 of Table 4, the UE measures interference power from an IMR and then subtracts interference power from the interfering cell. The interference power from the interfering cell corresponds to αQ. In this case, α is determined according to an RS used for measuring Q.

If the RS corresponds to a CRS of the interfering cell, the UE is able to know data to CRS power ratio in an OFDM symbol in which an interference CRS exists and an OFDM symbol in which the interference CRS does not exist with reference to $\rho_A$, $\rho_B$ of the interfering cell. In particular, the UE can configure the α as α=$\rho_B$ of interference cell in the OFDM symbol in which the interference CRS exists and configure the α as α=$\rho_A$ of interference cell in the OFDM symbol in which the interference CRS does not exist.

When the RS corresponds to a DMRS of the interfering cell, if a layer of the interfering cell is equal to or less than 2, the UE can configure the α as α=1. Otherwise, the UE can configure the α as α=0.5.

If the RS corresponds to a CRS-RS of the interfering cell, the UE can configure the α as α=$\rho_B$ of interference cell in an OFDM symbol in which an interference CRS exists and configure the α as α=$P_c$ of interference cell in an OFDM symbol in which the interference CRS does not exist. $P_c$ is a data to CSI-RS power ratio. The UE should receive the $P_c$ of the interfering cell in advance.

Referring to an operation 2 of a case 2 shown in Table 4, the UE measures interference power from the IMR and then adds residual interference power from the interfering cell to the interference power. The residual interference power from the interfering cell corresponds to αβQ. In this case, similar to the aforementioned proposal, α is determined according to an RS used for measuring Q. β corresponds to a factor for determining the residual interference power. The β is received from a base station or can be directly determined by the UE. The UE determines the β on the basis of measured SNR and INR. The SNR corresponds to a ratio of signal power received from a serving cell to interference power received from other cell (except an interfering cell becoming a target of NAICS). The INR corresponds to a ratio of interference power becoming a target of NAICS to interference power from other cell.

Referring to an operation 1 of case 3 and case 5 shown in Table 4, the UE measures interference power from the IMR and then subtracts CSI-RS power received from the interfering cell from the interference power. The interference CSI-RS power received from the interfering cell corresponds to αQ. In this case, α is determined according to an RS used for measuring Q.

If the RS corresponds to a CRS of the interfering cell, the UE configures the α as $$\alpha = \frac{\rho_A}{P_c}$$

of interference cell.

When the RS corresponds to a DMRS of the interfering cell, if a layer of the interfering cell is equal to or less than 2, the α can be configured as α=1/$P_c$. Otherwise, the α can be configured as α=0.5/$P_c$.

If the RS corresponds to a CSI-RS of the interfering cell, the α is set to 1.

Method of Measuring Interference Power Based on CRS

In the aforementioned embodiments, a method of measuring interference at an IMR has been described. Yet, when a UE measures interference using a CRS, it may also be able to perform a similar operation. Basically, the UE regenerates a CRS reception signal of the UE, subtracts the regenerated signal from a CRS, and measures reception power to measure interference power from a neighbor cell. However, in order to calculate a NAICS CQI, it is necessary to have a more delicate interference measurement scheme.

Table 5 shows a preferred interference measurement scheme of a UE according to whether or not there is data of an interfering cell in a specific RB and a type of a signal transmitted by the interfering cell at a CRS RE of the RB. Basically, the UE regenerates a CRS reception signal of the UE, subtracts the regenerated CRS reception signal and follows the interference measurement scheme shown in the Table. Since a CRS existing in a PDCCH region is affected by interference of a control signal transmitted by the interfering cell and a CRS existing in a PDSCH region is affected by interference of a data signal transmitted by the interfering cell, types of interference received from the interfering cell are different from each other in CRS REs of the two regions. If the UE is able to cancel the data signal transmitted by the interfering cell only, a CRS RE used for measuring interference power can be restricted to a CRS RE existing in the PDSCH region only.

TABLE 5

| Case | Whether or not data of interfering cell exist | Type of signal transmitted by interfering cell at CRS RE | Desired UE behavior at CRS RE |
|---|---|---|---|
| 1 | ○ | Data | Data-IC, and then interference power measure |
| 2 | ○ | Muting | Alt 1. Interference power measure Alt 2. adding residual interference, and then interference power measure |
| 3 | ○ | CRS | CRS-IC, and then interference power measure |
| 0 | X | Data | Not occurring case |
| 4 | X | Muting | interference power measure |
| 5 | X | CRS | CRS-IC, and then interference power measure |

If it is determined as data of an interfering cell exists in a specific RB, a UE assumes that a CRS of the interfering cell or data exists in a CRS RE of the RB. Hence, the UE assumes that the case 2 of Table 5 does not occur. If data of the interfering cell exists in a specific RB, the UE may follow an interference power measurement scheme such as the case 1 or the case 3 according to whether or not there is a CRS.

Method of Using Effective Channel Estimation

In the aforementioned interference channel power cancellation method, a scheme of measuring power of an interference channel using a CRS, a CSI-RS or a DMRS of an interfering cell and then subtracting the power of the interference channel from reception signal power measured at IMR has been proposed. Yet, since a channel measured from the CRS of the interfering cell is different from an effective channel of the interfering cell received by the UE, CQI accuracy can be degraded. In order to increase the CQI accuracy, the UE estimates an effective channel in a manner of multiplying the channel measured from the CRS by a precoder used by the interfering cell and then cancels power of the effective channel from the IMR.

To this end, the UE can determine the precoder used by the interfering cell at the IMR RE using two schemes described in the following.

According to a first scheme, precoder information is directly received from the interfering cell or a serving cell. In case of an ideal backhaul, it may be more efficient to receive the precoder information from the serving cell in which a control channel already exists. In case of a non-ideal backhaul that latency is big, it may be preferable to receive the precoder information from the interfering cell.

According to a second scheme, the UE directly performs blind detection.

The previously defined power Q of the interference channel is redefined as power ($\|HIPI\|2$, where HI corresponds to a CRS and PI corresponds to a precoder of the interfering cell used in the IMR RE) of an interference effective channel and the UE performs interference measurement using an identical scheme according to the cases and the operations shown in Table 4.

Method of Using RB Ratio Used for Transmitting Data

According to the aforementioned method of cancelling interference channel power, an interference channel measurement scheme is differentiated according to whether or not there exists interference data per RB. Hence, a UE receives information on whether or not there exists interference data from a serving cell or an interfering cell according to each RB. As a result, control channel overhead occurs. It may use an interference measurement scheme using a ratio (R) only of RBs used for transmitting data in the whole bandwidth RB of the interfering cell with a simple scheme requiring low control channel overhead.

For example, when a bandwidth consists of 10 RBs, if the interfering cell mutes 2 RBs and transmits data to the remaining 8 RBs, the UE receives R=0.8. In case of an ideal backhaul, it may be efficient to receive the R from a serving cell in which a control channel already exists. In case of a non-ideal backhaul that latency is big, it may be preferable to receive the R from the interfering cell. In Table 3, 4 and 5, since the UE knows whether or not there exists interference, an interference measurement scheme according to each RB is differentiated in a manner of being divided by cases. Yet, according to the proposed scheme, having received the R only, the UE assumes that interference data exists at the IMR all the time. In particular, the UE assumes the case 1 of Table 4. Subsequently, the UE subtracts interference power (i.e., $R\alpha Q$) suppressed by an R value from reception power measured at the IMR.

In addition, for more accurate subband CQI feedback, it may use an interference measurement scheme to which a ratio (R) of RBs used for transmitting data is reflected in RBs constructing a subband according to each subband. According to the scheme, a UE receives the ratio (R) from a serving cell or an interfering cell according to each subband. If the ratio for a subband i corresponds to Ri, the UE may follow an interference measurement scheme using a ratio of the muting RB to the PDSCH RB using the Ri when a CQI for the subband i is calculated.

For example, when a bandwidth consists of 8 RBs, if the interfering cell mutes at a first subband and transmits data using all 4 RBs at a second subband, the UE receives R1=0 and R2=1. A subband size according to a bandwidth is shown in Table 6. In case of an ideal backhaul, it may be efficient to receive the R from a serving cell in which a control channel already exists. In case of a non-ideal backhaul that latency is big, it may be preferable to receive the R from the interfering cell. In Table 3, 4 and 5, since the UE knows whether or not there exists interference, an interference measurement scheme according to each RB is differentiated in a manner of being divided by cases. Yet, according to the proposed scheme, having received the R1 and the R2 only, the UE assumes that interference data exists at the IMR all the time. In particular, the UE assumes the case 1 of Table 4. Subsequently, the UE subtracts interference power (i.e., $R1\alpha Q$) suppressed by an R1 value from reception power measured at the IMR existing in the subband 1. The UE measures interference power with the same scheme using the R2 with respect to the subband 2.

The aforementioned embodiments correspond to an interference measurement method used by a NAICS UE to calculate a CQI. Although there is a difference in complexity, there is a common in the proposed schemes. In particular, the UE calculates a CQI after removing an effect of dominant interference from interference power measured at the IMR RE or a CRS RE of a serving cell. Similarly, in case of calculating an RI, the UE can calculate the RI after removing the effect of dominant interference. For example, if the UE receives a ratio (R) of RBs used for transmitting data to the whole bandwidth RBs of the interfering cell, the UE can remove the effect of dominant interference in a manner of multiplying dominant interference power by the R when SINR for calculating an optimized RI is calculated.

TABLE 6

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Method of Using Scaling Factor

Capability of a NAICS UE capable of cancelling interference is determined according to various external variables which are configured at the time of data demodulation. For example, as a modulation order is getting bigger at the time of demodulating interference data, as reception power of interference to be cancelled is getting smaller, as reception power of a desired signal is getting bigger, accuracy of interference cancellation may decrease. Hence, it may be preferable to make a list of capabilities of the NAICS UE capable of cancelling interference for the variables and calculate a CQI to which the capabilities are reflected.

In addition to the aforementioned method of cancelling interference channel power, it may be able to use a method described in the following to calculate a CQI to which cancellation capability according to an external variable is reflected.

According to the method of cancelling interference channel power, a UE measures interference power from an IMR and then subtracts the interference power received from an interfering cell. In this case, the interference power is multiplied by a scaling factor r and then the interference power is subtracted.

The scaling factor r is determined by various external variables which are configured at the time of data demodulation. For example, the scaling factor is determined by an interference modulation order, reception power of interference to be cancelled, reception power of a desired signal, etc. In this case, a list of the scaling factors is stored in a UE. For example, if reception power of interference is very strong, accuracy of interference cancellation may increase. In this case, if the scaling factor r is set to 1, it is able to subtract all interference power from power measured at an IMR without any loss. Otherwise, interference power is not subtracted from the power measured at the IMR by setting the scaling factor r to 0.

For example, according to the case 1 of Table 4 and the first operations of case 3 and 5, interference power is calculated as αQ. In this case, a UE configures rαQ as interference power by applying the scaling factor to the αQ. And, it may also be able to determine interference power as rRαQ by applying the scaling factor to the method of using a ratio of RBs used for transmitting data.

Clean CQI

Referring to Table 3, 4 and 5, when a NAICS UE measures interference power at an IMR RE or a CRE RE, NAICS capability of the NAICS UE can be reflected to a CQI using a process of preferentially performing interference Data-IC in a corresponding RE or a process of adding residual interference. Yet, in the aforementioned processes, the UE should be aware of various parameters for an interference signal in the RE. For example, the UE should be aware of information on an interfering TP and PDSCH information of the interfering TP shown in Table 7 in the following.

TABLE 7

| | Parameters |
|---|---|
| Independently from the TM used in the NC. | CFI |
| | MBSFN configuration |
| | RI |
| | CRS AP |
| | Cell ID |
| | Modulation Order |
| | MCS |
| | RNTI |
| | TM |
| If CRS TMs are used in NC | PMI |
| | Data to RS EPRE, PA, PB |
| | System bandwidth |
| | PDSCH allocation |
| If DM-RS TMs are used in NC | PDSCH bandwidth for DM-RS |
| | Data to RS EPRE, PB |
| | DMRS APs |
| | nSCID |
| | CSI-RS presence and their pattern |
| | Virtual cell ID |

To know IP values at the time of calculating CSI may be difficult due to reasons described in the following. In the following description, assume that a TM 10 is set to a UE and interference is measured using an IMR. When a UE measures interference using a CRS, a same problem occurs.

For an enhanced CSI, it is important for a UE how to find out interference conditions in an RB including an IMR.

Although BD on interference conditions is enabled in a demodulation stage, it is difficult to anticipate BD performance of an identical level in a CSI calculation stage.

Figure 14:
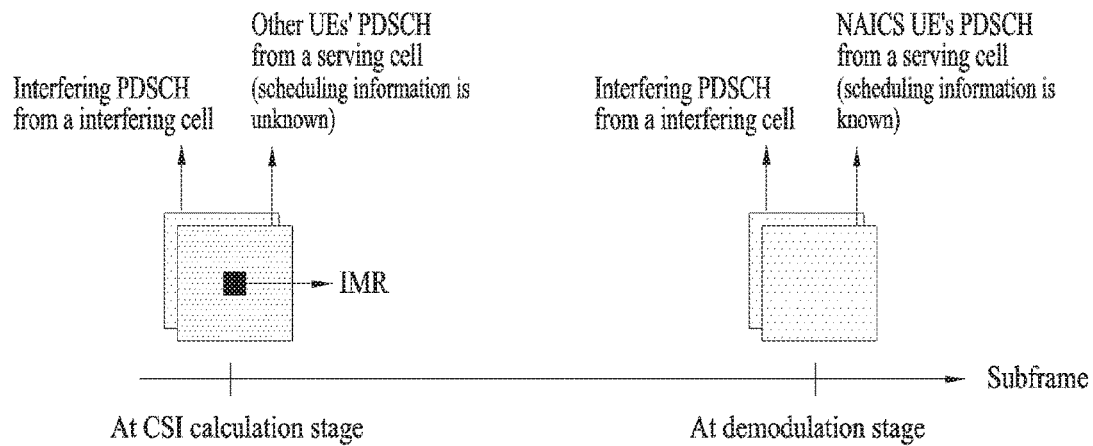
FIG. 14 is a diagram for an example indicating a difference of a BD condition between a CSI calculation stage and a demodulation stage.

This is because, as shown in FIG. 14, a UE attempts to perform BD under strong interference of a serving TP in the CSI calculation stage.

FIG. 14 is a diagram for an example indicating a difference of a BD condition between a CSI calculation stage and a demodulation stage.

In particular, although a UE is able to have good BD performance using scheduling information included in a DCI at a demodulation stage, when a CSI is calculated, the UE is unable to access a DCI of a different UE transmitted by a TP.

As an alternative, the UE is able to perform BD using an IMR RE muted by a serving TP only. Yet, due to a deficiency of sample REs for BD, BD performance can be considerably degraded.

In order to solve BD on IPs (interference parameters) at the time of calculating the CSI, discussion on various schemes is in progress. As a scheme of the various schemes, it may use a method of measuring residual interference in a state of no dominant interference and calculating a CQI based on the residual interference. Since the CQI corresponds to a CQI capable of being achieved when the UE completely cancels the dominant interference, the CQI can be referred to as a clean CQI. For example, as shown in Table 3, when an IMR is set to a UE, the clean CQI can be calculated in a manner that case 2 and 4 are to be occurred in the IMR via cooperation between base stations and the UE immediately measures interference at the IMR. To this end, a NAICS UE to which an IMR is set can assume as follows.

A UE expects that there is no interference from a dominant interfering cell becoming a target of interference cancellation/suppression at the IMR. In particular, the UE expects that the dominant interfering cell sets a ZP-CSI-RS at the IMR.

In order to secure muting of the dominant interfering cell at the IMR, it is necessary for a base station to identify a dominant interfering cell. Although the dominant interfering cell can be identified based on RSRP of a neighbor cell previously reported by the UE, since the RSRP is aperiodically reported using an event trigger scheme, RSRP information reported to the base station and RSRP information measured by the UE may be different from each other. Hence, the UE should report information (e.g., cell ID) on the dominant interfering cell to the base station. Or, similar to a CoMP scenario 4, when an RRH shares a cell ID, since it is difficult to identify a dominant interfering TP by the RSRP, the UE should report information (e.g., a virtual cell ID) on the dominant interfering TP to the base station.

If an IMR is not set to the UE, interference power is measured using a CRS. In this case, if a dominant interfering cell is collided with the CRS, the UE can report a clean CQI. When CRS collision occurs, case 3 and 5 occur only in Table 5. In this case, the UE performs CRS-IC on both a CRS of a serving cell and a CRS of the dominant interfering cell, measures interference and calculates a CQI based on the measured interference.

Meanwhile, although the aforementioned embodiments of the present invention have been explained under assumption of NAICS of an inter-cell situation, characteristics of the present invention can be identically applied to NAICS of a MU-MIMO situation as well. In particular, according to the aforementioned embodiments of the present invention, a UE is interfered by a data signal transmitted to a different UE of a neighbor cell and a scheme of calculating a CQI capable of being achieved by appropriately cancelling the interference by the UE has been explained. Yet, when a UE is interfered by a data signal transmitted to a different UE of an identical cell to which MU-MIMO is applied, characteristics of the present invention can be identically applied to a scheme of calculating a CQI capable of being achieved by appropriately cancelling the interference by the UE.

Figure 15:
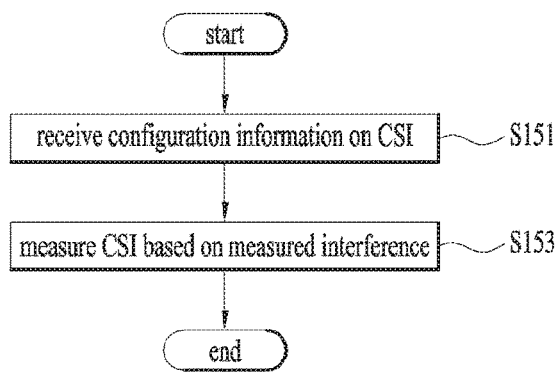
FIG. 15 is a flowchart for a method of receiving a signal according to one embodiment of the present invention.

A method of receiving a signal according to one embodiment of the present invention is explained with reference to FIG. 15.

In the step S151, a UE receives configuration information on channel state information using interference measurement.

Subsequently, in the step S153, the UE measures interference received from an interfering cell based on the configuration information and measures channel state information at an IMR (Interference Measurement Resource) based on the measured interference.

In this case, it may be preferable to perform the interference measurement based on whether or not data is transmitted from the interfering cell and a type of a signal transmitted at the IMR in a resource block at which the IMR exists.

Since detail contents according to the aforementioned steps are identical to detail contents of the present invention mentioned earlier with reference to FIGS. 12 to 14, explanation on the contents is omitted at this time.

Figure 16:
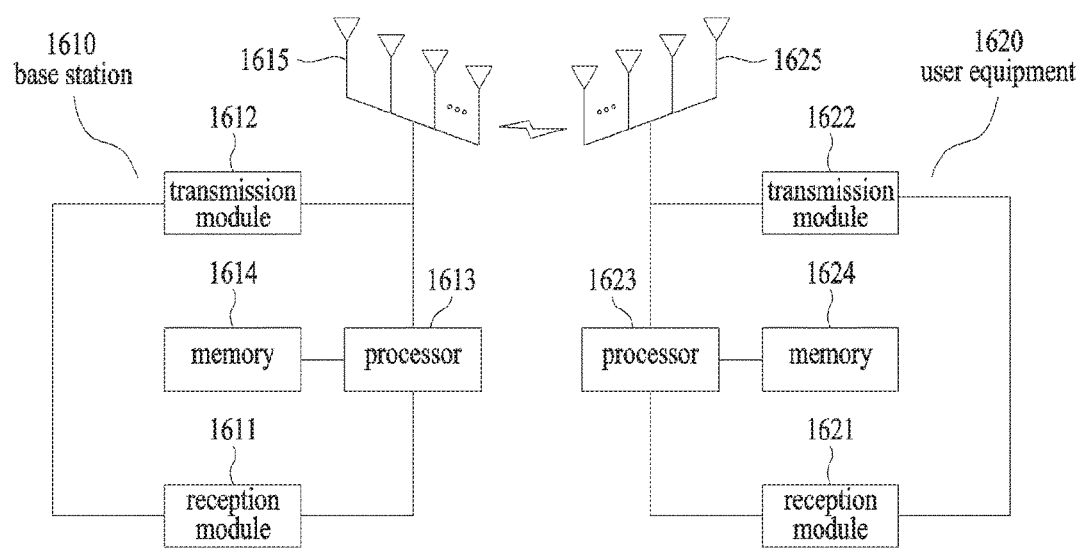
FIG. 16 is a diagram for configurations of a base station and a user equipment capable of being applied to one embodiment of the present invention.

FIG. 16 is a diagram for a base station and a user equipment capable of being applied to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 16, a wireless communication system includes a base station (BS) 1610 and a user equipment (UE) 1620. The BS 1610 includes a processor 1613, a memory 1614 and a radio frequency (RF) unit 1611/1612. The processor 1613 can be configured to implement the proposed functions, processes and/or methods. The memory 1614 is connected with the processor 1613 and then stores various kinds of information associated with an operation of the processor 1613. The RF unit 1616 is connected with the processor 1613 and transmits and/or receives a radio signal. The user equipment 1620 includes a processor 1623, a memory 1624 and a radio frequency (RF) unit 1621/1622. The processor 1623 can be configured to implement the proposed functions, processes and/or methods. The memory 1624 is connected with the processor 1623 and then stores various kinds of information associated with an operation of the processor 1623. The RF unit 1621/1622 is connected with the processor 1623 and transmits and/or receives a radio signal. The base station 1610 and/or the user equipment 1620 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The present invention can be used for a wireless communication device such as a user equipment, a relay, a base station, and the like.

What is claimed is:

1. A method of cancelling interference from a signal and receiving the signal by a user equipment in a wireless communication system, the method performed by the user equipment comprising:
receiving configuration information on channel state information;
performing an interference measurement from an interfering cell based on the configuration information; and
measuring the channel state information at an IMR (Interference Measurement Resource) based on measured interference,
wherein the interference measurement is performed based on whether or not data is transmitted from the interfering cell in a resource block at which the IMR exists and a type of a signal transmitted at the IMR.

2. The method of claim 1,
wherein if the data is transmitted from the interfering cell in the resource block at which the IMR exists and the type of the signal transmitted at the IMR corresponds to the data, the measuring the channel state information comprising:
detecting and regenerating an interference signal of the interfering cell at the IMR;
removing the regenerated interference signal at the IMR; and
measuring the channel state information based on interference power at the IMR.

3. The method of claim 1,
wherein if data is not transmitted from the interfering cell in the resource block at which the IMR exists and no signal is transmitted at the IMR, the measuring the channel state information comprising:
adding a random interference signal to the signal received at the IMR; and
measuring the channel state information based on interference power which is measured at the IMR.

4. The method of claim 1,
wherein if data is transmitted from the interfering cell in the resource block at which the IMR exists and a signal transmitted at the IMR corresponds to a CSI-RS (Channel-State Information-Reference Signal), the measuring the channel state information comprising:
detecting and regenerating the CSI-RS of the interfering cell at the IMR;
removing the regenerated CSI-RS at the IMR; and
measuring the channel state information based on interference power which is measured at the IMR.

5. The method of claim 1,
wherein if data is transmitted from the interfering cell in the resource block at which the IMR exists and a signal transmitted at the IMR corresponds to a CSI-RS (Channel-State Information-Reference Signal), interference power measurement is not performed at the IMR.

6. The method of claim 1,
wherein if data is not transmitted from the interfering cell in the resource block at which the IMR exists and no signal is transmitted at the IMR, the measuring the channel state information comprising:
performing interference power measurement at the IMR; and
measuring the channel state information at the IMR.

7. The method of claim 1,
wherein if data is not transmitted from the interfering cell in the resource block at which the IMR exists and a signal transmitted at the IMR corresponds to a CSI-RS (Channel-State Information-Reference Signal), the measuring the channel state information comprising:
detecting and regenerating the CSI-RS of the interfering cell at the IMR;
removing the regenerated CSI-RA at the IMR; and
measuring the channel state information based on interference power which is measured at the IMR.

8. A user equipment for cancelling interference from a signal and receiving the signal in a wireless communication system, the user equipment comprising:
a RF (Radio Frequency) unit; and
a processor,
wherein the processor is configured to:
receive configuration information on channel state information,
perform an interference measurement from an interfering cell based on the configuration information, and
measure the channel state information at an IMR (Interference Measurement Resource) based on measured interference,
wherein the interference measurement is performed based on whether or not data is transmitted from the interfering cell in a resource block at which the IMR exists and a type of signal transmitted at the IMR.

9. The user equipment of claim 8,
wherein if data is transmitted from the interfering cell in the resource block at which the IMR exists and a type of a signal transmitted at the IMR corresponds to the data, the processor is further configured to:

detect and regenerate an interference signal of the interfering cell at the IMR,
remove the regenerated interference signal at the IMR, and
measure the channel state information based on interference power at the IMR.

10. The user equipment of claim 8,
wherein if data is not transmitted from the interfering cell in the resource block at which the IMR exists and no signal is transmitted at the IMR, the processor is further configured to:
add a random interference signal to the signal received at the IMR, and
measure the channel state information based on interference power which is measured at the IMR.

11. The user equipment of claim 8,
wherein if data is transmitted from the interfering cell in the resource block at which the IMR exists and a signal transmitted at the IMR corresponds to a CSI-RS (Channel-State Information-Reference Signal), the processor is further configured to:
detect and regenerate the CSI-RS of the interfering cell at the IMR,
remove the regenerated CSI-RS at the IMR, and
measure the channel state information based on interference power which is measured at the IMR.

12. The user equipment of claim 8,
wherein if data is transmitted from the interfering cell in the resource block at which the IMR exists and a signal transmitted at the IMR corresponds to a CSI-RS (Channel-State Information-Reference Signal), the processor is further configured not to perform interference power measurement at the IMR.

13. The user equipment of claim 8,
wherein if data is not transmitted from the interfering cell in the resource block at which the IMR exists and no signal is transmitted at the IMR, the processor is further configured to:
perform interference power measurement at the IMR, and
measure the channel state information at the IMR.

14. The user equipment of claim 8,
wherein if data is not transmitted from the interfering cell in the resource block at which the IMR exists and a signal transmitted at the IMR corresponds to a CSI-RS (Channel-State Information-Reference Signal), the processor is further configured to:
detect and regenerate the CSI-RS of the interfering cell at the IMR,
remove the regenerated CSI-RA at the IMR, and
measure the channel state information based on interference power which is measured at the IMR.

\* \* \* \* \*